United States Patent [19]

Murata

[11] Patent Number: 5,715,329
[45] Date of Patent: Feb. 3, 1998

[54] DIGITAL COPYING MACHINE WITH MEMORY FOR COMPRESSED IMAGE DATA

[75] Inventor: Kazuyuki Murata, Tsuzuki-gun, Japan

[73] Assignee: Matsushita Electric Industrial Co., Ltd., Osaka, Japan

[21] Appl. No.: 216,094

[22] Filed: Mar. 22, 1994

Related U.S. Application Data

[63] Continuation of Ser. No. 907,778, Jul. 1, 1992, abandoned.

[30] Foreign Application Priority Data

Jul. 2, 1991 [JP] Japan ................. 3-161542

[51] Int. Cl.⁶ .............. H04N 1/41; H04N 1/46; G06K 9/38
[52] U.S. Cl. .............. 382/166; 358/426; 358/501; 358/505; 358/539; 358/296; 399/54; 399/223; 399/231; 399/298; 399/299
[58] Field of Search .................. 358/426, 444, 358/500, 501, 505, 515, 518, 524, 539, 404, 296; 382/56, 166; 355/327; 347/115, 232; 399/54, 223, 231, 298, 299

[56] References Cited

U.S. PATENT DOCUMENTS

| | | | |
|---|---|---|---|
| 4,369,463 | 1/1983 | Anastassiou et al. | 358/430 |
| 4,591,903 | 5/1986 | Kawamura et al. | 358/540 |
| 4,630,128 | 12/1986 | Gokita | 358/296 |
| 4,802,229 | 1/1989 | Yamada | 358/406 |
| 4,814,898 | 3/1989 | Arimoto et al. | |
| 4,887,151 | 12/1989 | Wataya | 358/539 |
| 4,896,146 | 1/1990 | Narumiya | 358/524 |
| 4,905,079 | 2/1990 | Hayashi | 358/512 |
| 4,907,094 | 3/1990 | Mishima et al. | 358/437 |
| 4,931,815 | 6/1990 | Sato et al. | |
| 4,935,281 | 6/1990 | Tolbert et al. | |
| 4,955,066 | 9/1990 | Notenboom | 382/56 |
| 5,029,112 | 7/1991 | Sakamoto et al. | 364/521 |
| 5,073,820 | 12/1991 | Nakagawa et al. | 358/133 |
| 5,121,445 | 6/1992 | Tsujiuchi et al. | 358/408 |
| 5,122,873 | 6/1992 | Golin | 358/13 |
| 5,142,355 | 8/1992 | Fujima | 358/515 |
| 5,194,945 | 3/1993 | Kadowaki et al. | 358/518 |
| 5,216,518 | 6/1993 | Yamagami | 358/426 |
| 5,285,290 | 2/1994 | Sakai et al. | 358/404 |
| 5,289,270 | 2/1994 | Hayashi | 358/512 |
| 5,311,328 | 5/1994 | Murata | 358/518 |
| 5,379,355 | 1/1995 | Allen | 382/56 |

FOREIGN PATENT DOCUMENTS

| | | |
|---|---|---|
| 61-150570 | 7/1986 | Japan. |
| 61-176262 | 8/1986 | Japan. |
| 61-192167 | 8/1986 | Japan. |
| 3-48576 | 3/1991 | Japan. |
| 3-150963 | 6/1991 | Japan. |
| 04241968 | 8/1992 | Japan. |
| 05327984 | 12/1993 | Japan. |

Primary Examiner—Edward L. Coles, Sr.
Assistant Examiner—Kimberly A. Williams
Attorney, Agent, or Firm—Ratner & Prestia

[57] ABSTRACT

A digital copying machine provided with a device for forming color images by the formation, superposition of the images for each color in the order of the color face including a device for coding, compressing of a plurality of image signals separated in color by one page portion of the document so as to store in memory, a device for decoding, extending a plurality of compressed image signals stored in the memory, a color correcting device for converting a plurality of extended image signals into the color image signals for image formation so as to make the memory capacity smaller.

17 Claims, 18 Drawing Sheets

```
16  11  10  16  24  40  51  61
12  12  14  19  26  58  60  55
14  13  16  24  40  57  69  56
14  17  22  29  51  87  80  62
18  22  37  56  68 109 103  77
24  35  55  64  81 104 113  92
49  64  78  87 103 121 120 101
72  92  95  98 112 100 103  99
```

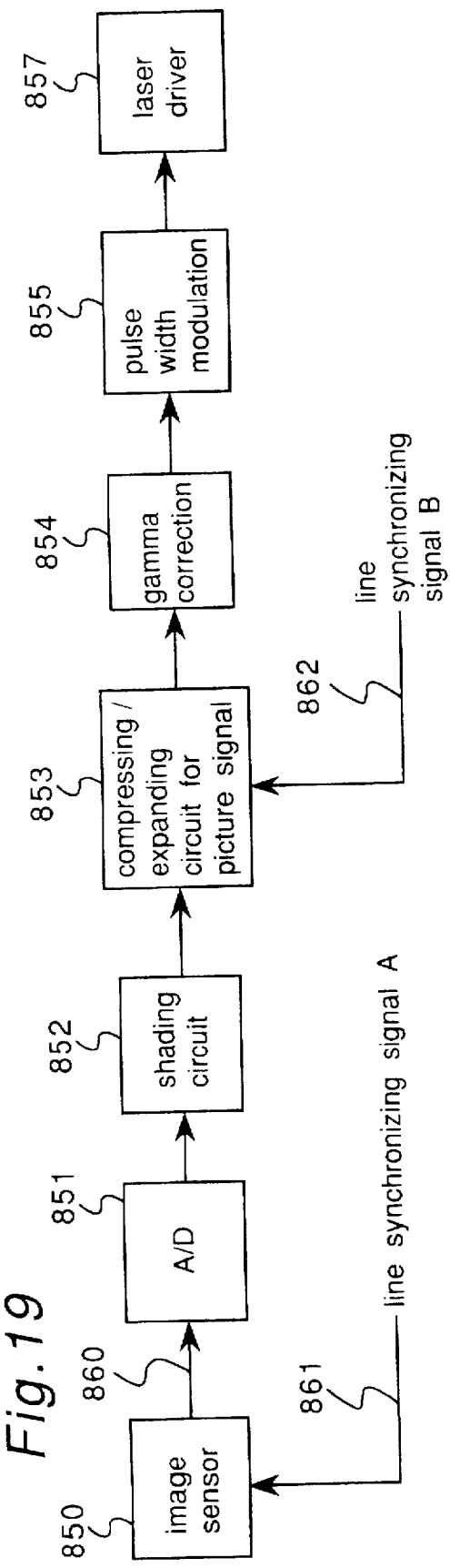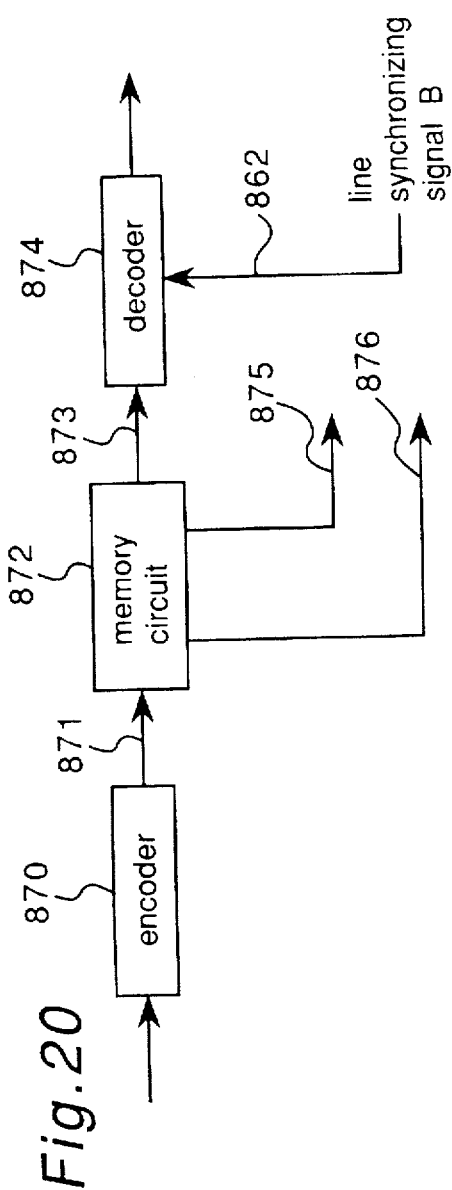

DIGITAL COPYING MACHINE WITH MEMORY FOR COMPRESSED IMAGE DATA

This is a continuation of application Ser. No. 07/907,778 filed Jul. 1, 1992, now abandoned.

BACKGROUND OF THE INVENTION

The present invention generally relates to a digital copying machine provided with an image signal compressing, expanding means and memories for storing compressed image signals.

In recent years, higher speeds, more functions, higher resolution, higher picture quality are demanded in the digital copying machines. In order to achieve them, digital copying machines with memories for image signal use being mounted in it are examined.

A first embodiment of the above described conventional digital copying machine will be described hereinafter with reference to the drawings.

FIG. 21 is a block diagram showing the flowing of the image signals in a first embodiment of the conventional digital copying machine. In FIG. 21, reference numeral 501 is a line image sensor for outputting image signals 502, 503 and 504 of a document color separated into R, G, B. Reference numeral 505 is a shading correcting circuit for correcting the shading distortion of the image signals from the image sensor 501. Reference numeral 506 is a gamma correcting circuit for correcting the gradation property of the image signals corrected in the shading. Reference numeral 507 is a masking processing circuit for calculating a proper amount of C (cyan), M (magenta), Y (yellow) signals necessary for printing. Reference numeral 508 is a UCR processing circuit for calculating from C, M, Y signals Bk (black) proper for ink plate production. The UCR circuit 508 selects one from among the C, M, Y and Bk so as to output a signal 510. Reference numeral 509 is a dither processing circuit for binary-coding half tone image signals with the use of a dither method. Reference numeral 511 is a multi-level code circuit for further effecting pulse width modulation of the binary-coded signals by a dither processing circuit 509 so as to raise the gradation property in the half tone. Reference numeral 512 is a laser driver for driving a semiconductor laser with pulse width modulated signals from the multi-level code circuit 511.

A printer portion including a laser driver 512 is a known laser beam printer for forming images in the plane order for each of C, M, Y, Bk color planes so as to reproduce the color images of the document by the superposition thereof. Thus, the image sensor 501 auxiliarily scans the document four times. The UCR circuit 508 converts the signals of the C, M, Y, Bk for each of the sub-scanning operations of the document reading (for example, in Japanese Patent Laid-Open Publication No. 59-161970).

A second embodiment of the conventional digital copying machine will be described hereinafter with reference to the drawings.

FIG. 22 is a block diagram showing the flowing of the image signals in a second embodiment of the conventional digital copying machine. In FIG. 21, reference numeral 601 is a line image sensor for outputting image signals 602, 603 and 604 of the document color separated into the R, G, B. Reference numeral 605 is a shading correcting circuit for correcting the shading distortion of the image signals from the image sensor 601. Reference numeral 606 is a gamma correcting circuit for correcting the gradation property of the image signals corrected in the shading. Reference numeral 607 is a color correcting circuit for calculating 8-bit signal Y (yellow), M (magenta), C (cyan) of a proper amount necessary for the printing and also, calculates a proper 8-bit signal Bk (black) for - - - production. Reference numeral 609 is a dither processing circuit for outputting 3-bit signals Cd, Yd, Md and Bkd through processing with the use of the dither method. Reference numerals 610, 611 an 612 are buffer memories for effecting the FIFO operation for respectively delaying the signals Cd, Md and Yd by given time so as to output the signals Cdd, Mdd and Ydd. Reference numerals 613, 614, 615 and 616 are laser drivers for driving semiconductor lasers respectively in accordance with the signals Cdd, Mdd, Ydd and Bkd (for example, Japanese Patent Laid-Open Publication No. 1-269365).

A third embodiment of the conventional digital copying machine will be described hereinafter with reference to the drawings.

FIG. 23 is a block diagram of the image processing portion in the third embodiment of the conventional digital copying machine. In FIG. 23, reference numeral 311 is a R (red) line sensor, reference numeral 312 is a G (green) line sensor, reference numeral 313 is a B (blue) line sensor. Reference numerals 314, 315, 316 are A/D converters each converting the analog signals from the line sensor into the digital signals. An A/D converter 316 outputs a signal 322. Reference numeral 317 is a n line delay memory for delaying by a n line portion the signals from the R line sensor so as to output the R sensor signal 320 delayed by a n line. Reference numeral 318 is a m line delay memory by a m line portion the signals form the G line sensor so as to output the G line sensor signal 321 delayed by a m line (for example, Japanese Patent Laid-Open Publication 1-109966).

A fourth embodiment of the conventional digital copying machine will be described hereinafter with reference to the drawings.

FIG. 24 is a block diagram showing the flowing of the image signals in a fourth embodiment of the conventional digital copying machine. In FIG. 24, reference numeral 650 is a line image sensor for outputting the image signals 660 of the document. Reference numeral 651 is an A/D converter for converting into the digital image signal the image signal 660 from the image sensor 650. Reference numeral 652 is a shading correcting circuit for correcting the shading distortion of the image signal caused in the reading operation. Reference numeral 653 is a buffer memory for effecting a FIFO operation for temporarily buffering the image signals corrected in the shading. Reference numeral 654 is a gamma correcting circuit for correcting the gradation property of the image signals read from the buffer memory 653. Reference numeral 655 is a pulse width modulating circuit for effecting the pulse width modulation in accordance with the inputted image signal. Reference numeral 512 is a laser driver for driving the semiconductor laser with the pulse width modulated signals from the pulse width modulating circuit 655. A printer portion including the laser driver 657 is a known laser beam printer.

In the present embodiment, assume that the resolution degree of the sub-scanning direction at the document image reading time is 400 DPI, and the sub-scanning speed is 7 inch/sec, and the frequency of the line horizontal synchronizing signal A661 of the image sensor 650 is 2.8 KHz. Assume that the sub-scanning speed at the image forming time of the printer portion is 6 inch/sec, and the frequency of the line horizontal synchronizing signal B662 where the image is read from the buffer memory 653 is 2.4 KHz. Assume that a continuous print speed of the A3 size of the printer portion is 20 sheet/sec (3 sec/sheet) when the document of the A3 size is continuously copied. At this time, it takes (420 mm)/(7 inch/sec)=2.36 sec for the document reading portion to effect an sub-scanning operation of the document of A3 size, the document reading portion has only to effect a return operation to the waiting position after the acceleration and sub-scanning completion for the sub-scanning operation within 0.64 sec or less. The sub-scanning speed of the image reading portion can be made the same as the sub-scanning speed of the printer portion without provision of the buffer memory 653, much time for the returning operation to the waiting portion after the acceleration and the sub-scanning completion can be retained. As the sub-scanning speed of the document reading portion is faster than the sub-scanning speed of the printer portion, the buffer memory 653 requires at least the 946 line portion of capacity.

But in the construction of such first conventional embodiment as described hereinabove, the document reading portion requires to scan the same document each time the printer portion effects the image formation of each color. As the driving operation can be effected at high speed, setting to the sub-scanning portion of the document reading portion to the operation of the printer portion when the high speed copying operation is effected, with a problem point that the high speed copying operation is hard to effect. In order to solve the problem point, it is considered that the memory of one page portion of the document image is provided. But the memory capacity increases with increase in the number of the picture elements accompanied by the high resolution and in the number of the bits per picture element accompanied by the higher picture quality, with a problem that the cost increases.

In the construction of a second conventional embodiment, the buffer memory capacity increases with increase in the number of the picture elements accompanied by the high resolution and in the number of the bits per picture element accompanied by the higher picture quality, with a problem that the cost increases.

In addition, in the construction of a third embodiment, the zoom range accompanied by multifunctions is expanded, the pitch between the lines of the color image sensor accompanied by the high resolution becomes larger with respect to the pitch between the document scanning lines, so that the capacity of the line delay memory increases, with a problem that the cost increases.

In the construction of a fourth conventional embodiment, the capacity of the memory increases with increase in the number of the picture elements accompanied by high resolution and in the number of the bits per picture element accompanied by the high picture quality, with a problem that the cost increases.

SUMMARY OF THE INVENTION

Accordingly, the present invention has been developed with a view to substantially eliminating the above discussed drawbacks inherent in the prior art, and has for its essential object to provide an improved digital copying machine.

Another important object of the present invention is to provide an improved digital copying machine which is provided with an image signal compressing, expanding means for reducing the memory capacity for making speeds higher, functions more, resolution higher, picture quality higher without the cost being made higher.

In accomplishing these and other objects, according to one preferred embodiment of the present invention, there is provided a digital copying machine of the present invention which includes a document reading means for reading the image information of a document so as to output a plurality of image signals resolved in color, an image signal compressing means for coding the above described plurality of image signals, a memory capable of storing by at least one page portion of maximum document size image signals coded by the image signal compressing means, an image signal expanding means for decoding the compressed image signals stored in the above described memory so as to expand them, a color correcting means for converting into color image signals for the image formation a plurality of image signals decoded by the above described image signal expanding means, an image forming means for forming color images in the order of color face on a recording medium in accordance with the image signals from the above described color correcting means.

A digital copying machine of the present invention comprising a document reading means for outputting a plurality of image signals of many reading gradations with the image information of the document being resolved in color, a color printer provided with a plurality of image forming means for each color, an image signal processing means for processing the color image signals from the above described document reading means so as to output a plurality of image signals for each of the plurality of image forming means, and which is characterized in that an image signal compressing means for coding, compressing the above described image signals, a memory for storing image signals less than one page portion of the maximum document size coded by the image signal compressing means, the mage signal expanding means for decoding, expanding the image signals stored in the above described memory are provided so as to delay a plurality of image signals for each of the above described image forming means by a given time portion different for each of image forming means, color images are reproduced by the image forming means for each of the above described colors in accordance with a plurality of image signals of each color decoded by the above described image signal expanding means.

A digital copying machine of the present invention comprises a document reading means for disposing in parallel at given intervals sensor rows with light receiving elements being arranged, reading the image information of the document resolved in color with the use of the color line image sensor with filters being provided for color resolution for each of the above described line rows, a delay means for delaying by a given line portion a plurality of image signals for each color from the document reading means so as to output at the same time the reading image signals of the same position of the document, and which is characterized in that there are provided an image signal compressing means for coding, compressing the image signals, a memory for storing the image signals coded by the image signal compressing means, and an image signal expanding means for decoding, expanding the image signals stored in the above described memory.

In addition, a digital copying machine of the present invention comprises a document reading means for reading the image information of a document, outputting the image signals, an image forming means for forming images on the recording medium in accordance with the above described image signals, images by the above described image forming means are formed while reading the document images by the above described document reading means, and which is characterized in that an image signals compressing means for coding, compressing the above described image signals, a memory capable of storing image signals less than one page portion of the document images coded by the image signal compressing means, an image signal expanding means for decoding, expanding the image signals stored in the above described memory, the sub-scanning speed of the above described document reading means is made faster than the sub-scanning speed of the above described image forming means.

The digital copying machine of the present invention is provided with a compression ratio setting means for making larger the compression ratio of the image signal compressing means when the capacity of the memory is insufficient, making smaller the compression ratio of the image signal compressing means when the capacity of the memory is sufficient in the prescanning operation in prior to the copying operation.

By the above described construction, the digital copying machine of the present invention is provided with a memory for storing by at least one page portion of the maximum document size the coded color image signals. Even in the high speed copying operation, the sub-scanning portion of the document reading portion is not necessary to effect a high speed operation, setting to the operation of the printer portion, and compressed image siganls are stored in the memory so that the capacity of the memory can be made smaller, thus reducing the memory cost extremely. The digital copying machine of the present invention is provided with a secondary storing means such as magnetic recording apparatus, optical recording apparatus and so on, is provided with means for storing, reproducing the compressed image signals. Many document images can be stored, reproduced without increase in the storing capacity of the secondary storing means. Further, the digital copying machine of the present invention is provided with an interface for inputting, outputting the compressed image signals of the above described memories with respect to the external appliances. With less transfer data amount, the document image signals can be outputted to the external appliances or the image signals from the external appliances can be printed.

By the above described construction, a digital copying machine provided with an image forming means of each color in the present invention can make the memory capacity small by the storing operation in the memory for delaying the compressed image signals if the number of the picture elements by the high resolution increases and the number of the bits per picture element accompanied by the high picture quality.

By the above described construction, a digital copying machine using a color image sensor of a line parallel type in the present invention can make the memory capacity less for delaying the line by the storing operation of the compressed image signals in the memory for delaying by a given line portion if the number of the picture elements by the high resolution increases, the enlarging range at the enlarging copying time increases, and the number of the bits per picture elements accompanied by the high picture quality increases.

In addition, a digital copying machine for forming images by an image forming means while reading the document images by the document reading means of the present invention can make the memory capacity for buffering smaller by the storing operation of the compressed image signals in the buffer memory if the number of the picture elements by the high resolution increases, the number of the bits per picture element accompanied by high picture quality increases, so that the memory cost may be lowered.

The digital copying machine provided with the image compressing expanding means of the present invention is provided with a compression ratio setting means for making the compression ratio of the image signal compressing means larger when the capacity of the memory is insufficient, for making the compression ratio of the above described image signal compressing means smaller when the capacity of the memory is sufficient in the document prescanning operation of the document prior to the copying operation, so that the memory capacity can be used efficiently.

As the memory can be increased for addition of the memory capacity, the memory can be added in accordance with the necessary picture quality when the picture quality deterioration by the compression processing becomes a problem.

BRIEF DESCRIPTION OF THE DRAWINGS

These and other objects and features of the present invention will become apparent form the following description taken in conjunction with the preferred embodiment thereof with reference to the accompanying drawings, in which;

FIG. 19 is a block diagram showing the flowing of the image signals of a fourth embodiment of the digital copying machine of the present invention;

FIG. 20 is a block diagram of an image signal compressing, extending circuit 853 in FIG. 19;

DETAILED DESCRIPTION OF THE INVENTION

Figure 1:
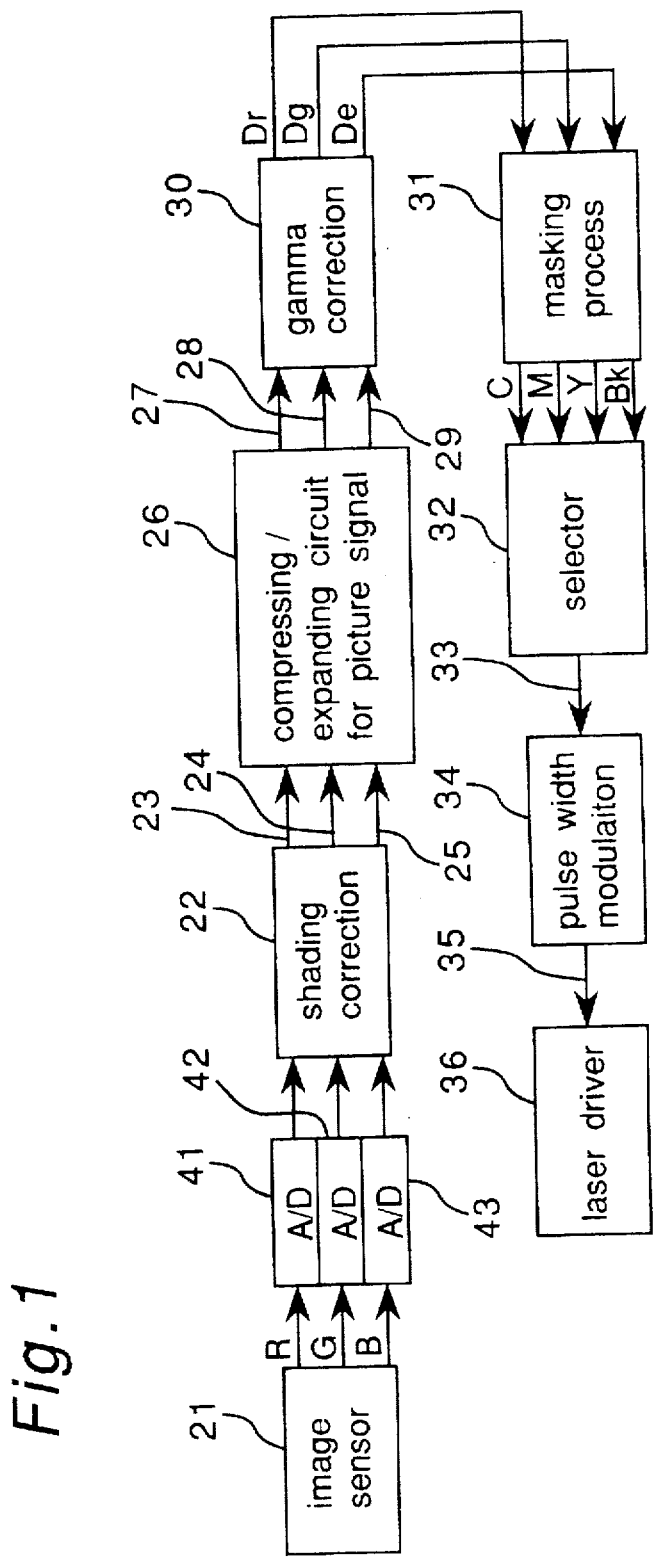
FIG. 1 is a block diagram of an image signal processing portion in a first embodiment of the present invention.

Before the description of the present invention proceeds, it is to be noted that like parts are designated by like reference numerals throughout the accompanying drawings.

A first embodiment of the present invention will be described hereinafter with reference to the drawings.

FIG. 1 is a block diagram of an image signal processing portion in a first embodiment of the present invention. Referring now to FIG. 1, reference numeral 21 is a line image sensor for outputting image signals R, G and B of the document color separated into R, G, B. Reference numeral 41, 42 and 43 are A/D converters for converting the image signals R, G and B coming from the line image sensor 21 into digital signals. Reference numeral 22 is a shading correcting circuit for correcting the shading distortion of the digital image signal from the image sensor 21. Reference numeral 26 is an image signal compressing, expanding circuit for coding, compressing the image signals of one page portion of the document so as to decode them after the storing them in a memory for outputting the image signals 27, 28 and 29. Reference numeral 30 is a gamma correcting circuit for correcting the gradation property of the image signals so as to output the gradation-corrected image signals Dr, Dg and Db. Reference numeral 31 is a masking processing circuit for calculating a proper amount C (cyan), M (magenta), Y (yellow) necessary for printing with the use of the image signals Dr, Dg and Db corrected in gradation so as to calculate a proper Bk (black) for ink plate production. Reference numeral 32 is a selector for selecting one of the C, M, Y and Bk so as to output a signal 33. Reference numeral 34 is a pulse width modulating circuit for effecting pulse width modulation in accordance with the signal 33 selected by a selector 33 so as to output an image signal 35 modulated in the pulse width. Reference numeral 36 is a laser driver for driving a semiconductor laser with an image signal 35 modulated with the pulse width.

A printer portion including a laser driver 36 is a known laser beam printer for forming the images in the plane order for each of C, M, Y, Bk color planes so as to reproduce the color images of the document by the superposition of them.

The image signal compressing, expanding circuit 26 in FIG. 1 will be described with reference to the drawings.

Figure 2:
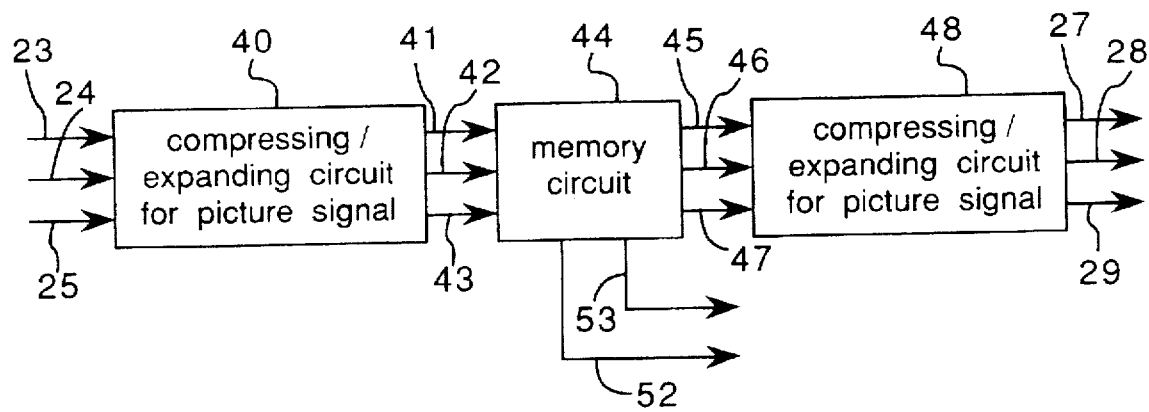
FIG. 2 is a block diagram of an image signal compressing, expanding circuit 26 in FIG. 1.

FIG. 2 is a block diagram of an image signal compressing, expanding circuit 26. In FIG. 2, reference numeral 40 is an image signal compressing circuit for coding the image signals 23, 24 and 25 to compress them so as to output the compressed image signals 41, 42 and 43. Reference numeral 44 is a memory circuit provided with a memory for storing by one page portion of the document the coded image signals for storing the coded image signals 41, 42 and 43. The memory circuit 44 outputs a memory insufficient value 52 showing the insufficient memory capacity if the memory capacity is insufficient at a time point when the sub-scanning reading operation of the document has been completed one passage, and outputs a memory sufficient value 53 showing the remaining memory capacity if the memory capacity is sufficient. The control portion of the digital copying machine not shown sets the parameter of the image compressing circuit 40 so that the ratio may become an optimum compression ratio with the use of the memory insufficient value 52 and the memory sufficient value 53.

The determination of the above described parameters by the control portion of the digital copying machine is effected in accordance with the memory insufficient value 52 and the memory sufficient value 53 at a time point when the reading scanning (prescanning) operation of the document to be effected prior to the copying operation of the document has been completed. When the memory capacity is insufficient at the prescanning completion time point, the above described control portion judges that the resetting operation of the above described parameter is not required so as to effect a copying operation in accordance with the image signal stored in the memory circuit 44 without the reading scanning of the document. When the surplus of the memory capacity is more at the prescanning completion time point, the above described control portion re-sets the above described parameter so that the comparison ratio may become small. When the memory capacity is insufficient, the above described control portion re-sets the above described parameter so that the compression ratio may become large so as to effect the prescanning operation again.

Reference numeral 48 is an image signal expanding circuit for decoding the coded image signals 45, 46 and 47 to be outputted from the memory circuit so as to output the expanded image signals 27, 28 and 29.

The memory of the memory circuit 44 may be increased. The compression ratio of the image signals in the image signal compressing circuit 40 may be made smaller by the increase in the above described memory. Therefore, the higher picture quality of the copying images can be easily effected.

The image signal compressing, expanding circuit 40 and an image signal expanding circuit 48 in FIG. 2 will be described hereinafter with the use of the drawings.

Figure 3:
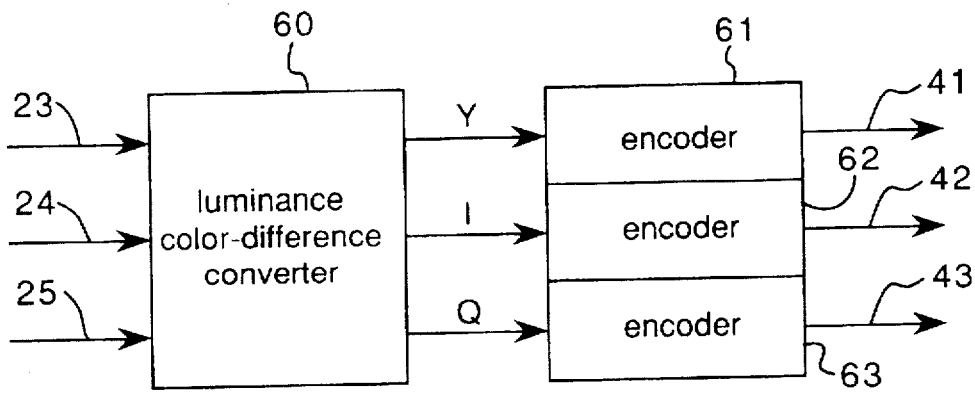
FIG. 3 is a block diagram of an image signal compressing circuit 40 in FIG. 2.

FIG. 3 is a block diagram of an image signal compressing circuit 40 in FIG. 2. In FIG. 3, reference numeral 60 is a luminance color difference converting circuit for converting the image signals 23, 24 and 25 corresponding to the R, G, B into a luminance signal Y and color difference signals I, Q. Reference numerals 61, 62, 63 are coding circuits of the same construction for respectively coding image signals Y, I, Q so as to output the coded image signals 41, 42, 43. Although the luminance color difference converting circuit is not always necessary, the compression ratio is improved when the R, G, B signals have been converted into the Y, I, Q signals.

Figure 4:
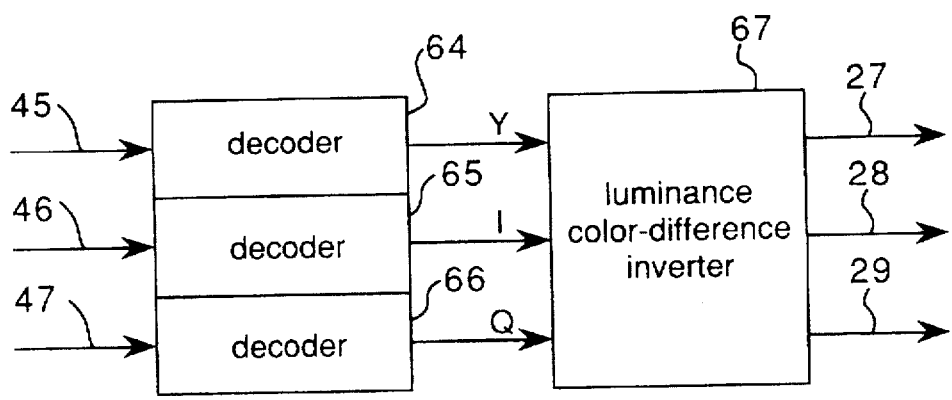
FIG. 4 is a block diagram of an image signal expanding circuit 48 in FIG. 2.

FIG. 4 is a block diagram of an image signal expanding circuit 48 in FIG. 2. In FIG. 4, reference numerals 64, 65, 66 are decoding circuits of the same construction for respectively decoding the coded image signals 45, 46 and 47 read by the memory circuit 44 so as to output the decoded image signals Y, I, Q. Reference numeral 67 is a brilliance color difference reverse converting circuit for converting the brilliance signal Y and the color signals I, Q into image signals corresponding to R, G, B.

Figure 5:
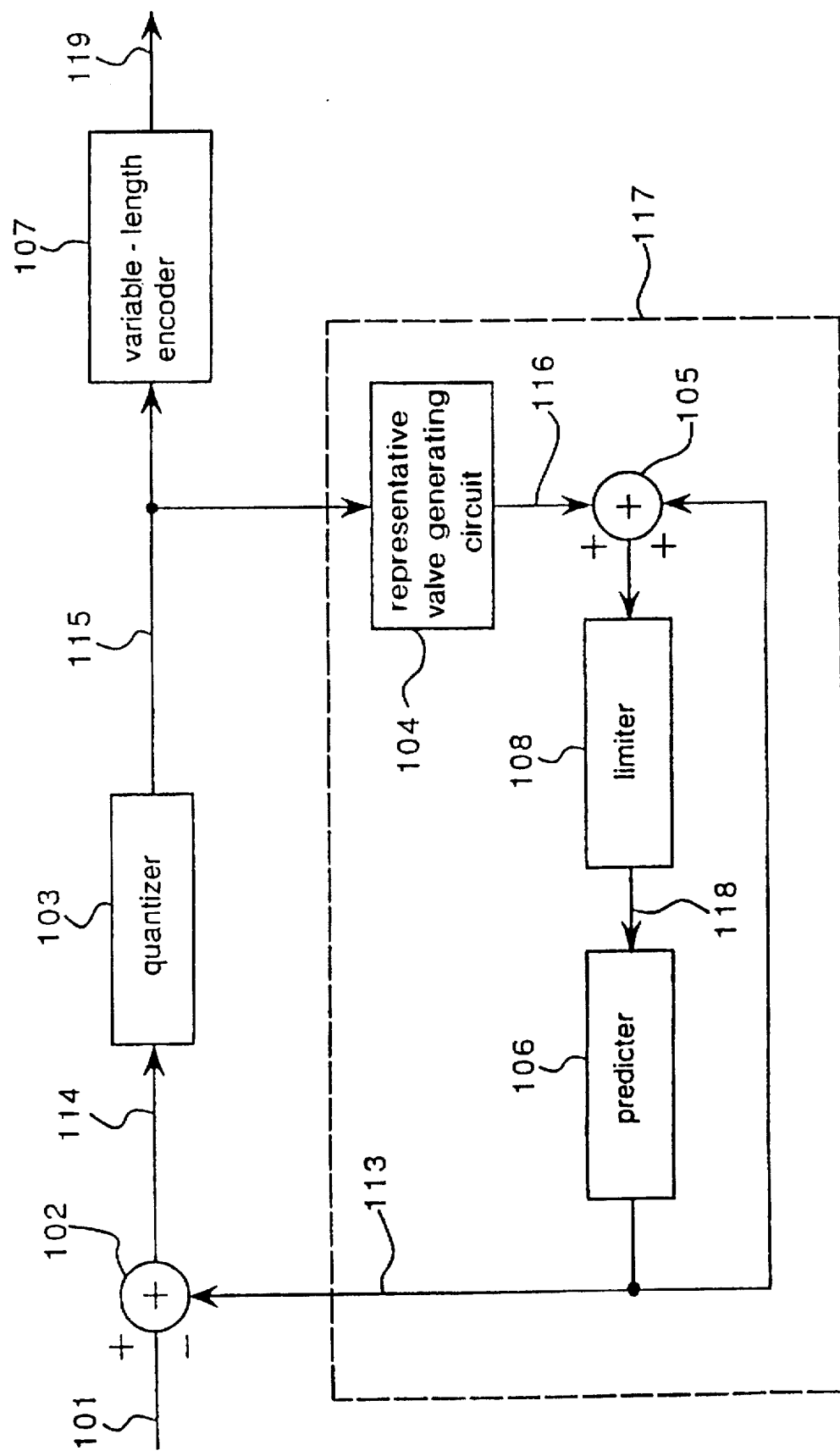
FIG. 5 is a block diagram of a first embodiment of a coding circuit 61 in FIG. 3.

FIG. 5 is a block diagram in a first embodiment of a coding circuit 61 in FIG. 3. In FIG. 3, reference numeral 101 is an input image signal, reference numeral 102 is a subtracter for subtracting a predicted image signal 113 from the input image signal 101 so as to output the difference signal 114. Reference numeral 103 is a quantizing circuit for effecting a non-linear quantizing operation of a difference signal 114 so as to output a quantizing signal 115. Reference numeral 117 is a local decoding circuit which is composed of a representative value producing circuit 104, an adder 105, a limiter 108 and a predicting circuit 106. The representative value generating circuit 104 effects the reverse quantization of the quantizing signal 115 so as to output the representative value signal 116. The adder 105 adds a predicted image signal 113 for outputting a predicting circuit 106 to a representative value signal 116. A limiter 108 restricts the output signal of the adder 105 to a dynamic range the same as that of the input image signal 101 so as to output the local decoding signal 118. The predicting circuit 106 predicts the image signal to be coded at a next time with the use of the previous local decoding signal 118 so as to output the predicted image signal 113. Reference numeral 107 is a variable length coding circuit for huffman code or the like for assigning a code as short as a value high in the generating probability of the quantizing signal 115 so as to output the coded image signal 119. The coding circuit 61 composed as described hereinabove is a known prediction coding (DPCM) circuit.

The example of the relation of the input, output data of the quantizing circuit 103 is shown in Table 1.

TABLE 1

| input data | output data |
|---|---|
| more than −48 | −3 |
| −47—−18 | −2 |
| −17~−1 | −1 |
| 0 | 0 |
| 1~17 | 1 |
| 18~47 | 2 |
| more than 48 | 3 |

Although the quantizing signal 115 is expressed with a coded 3-bit in the example of the Table 1, the compression ratio of the image data with the coding can be changed by the conversion of the bit number of the signals after the quantization with respect to the input data. The control portion of the digital copying machine not shown sets the quantizing characteristic of the quantizing circuit 103 so that the memory using efficiency of the memory circuit 44 may become optimum. When the quantizing circuit is constructed of a look up table (LUT), the control portion of a digital copying machine not shown can renew the data of the LUT.

Figure 6:
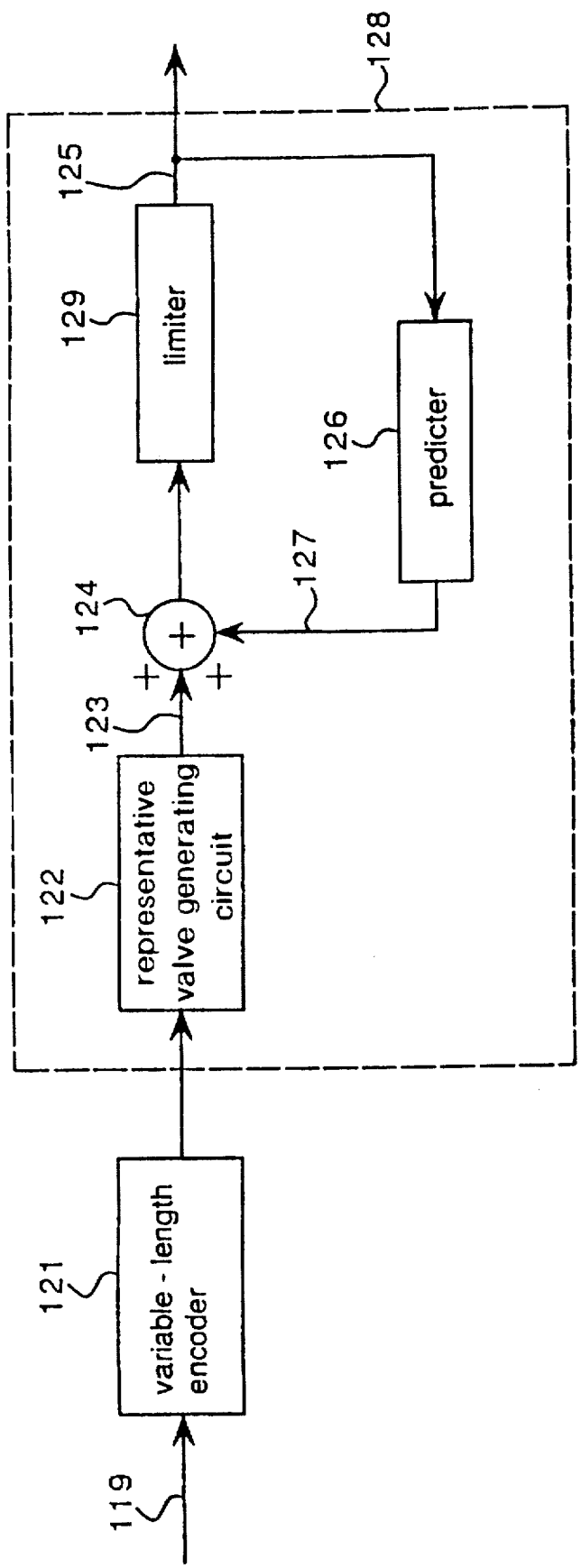
FIG. 6 is a block diagram of the first embodiment of a decoding circuit 64 in FIG. 4.

FIG. 6 is a block diagram of a decoding circuit 64 in FIG. 4. In FIG. 6, reference numeral 121 is a variable length code decoding circuit for decoding a variable length coded image signal 119. The representative value generating circuit 122 reversely quantizes the quantized difference signal so as to output the representative value signal 123. Reference numeral 124 is an adder for adding the representative value signal 123 to the predicted image signal 127. Reference numeral 129 is a limiter for restricting the output signal of the adder 124 to a dynamic range the same as the image signal before the coding of the output signal of the adder 124 so as to output the decoding signal 125. The predicting circuit 126 predicts the next image signal with the use of the previous decoding signal 125 so as to output the predicted image signal 127. A portion surrounded with the dotted lines in FIG. 6 is the same in construction as the local decoder 117 in FIG. 5.

Figure 7:
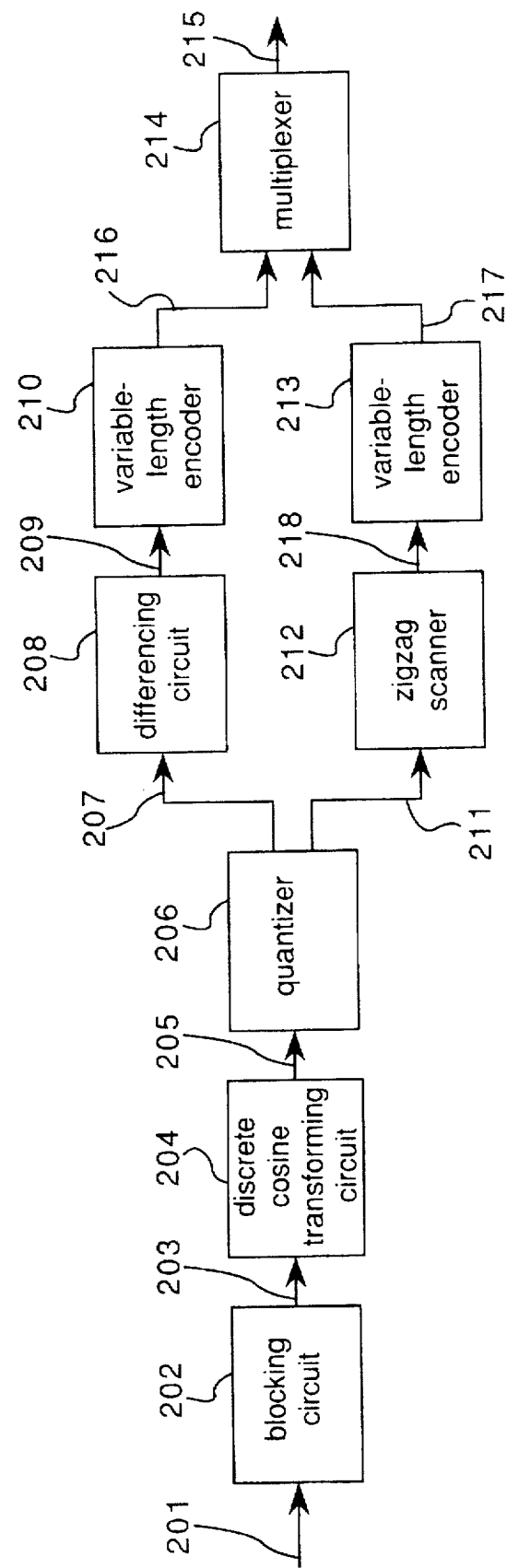
FIG. 7 is a block diagram in a second embodiment of a coding circuit 61 in FIG. 3.
Figure 8:
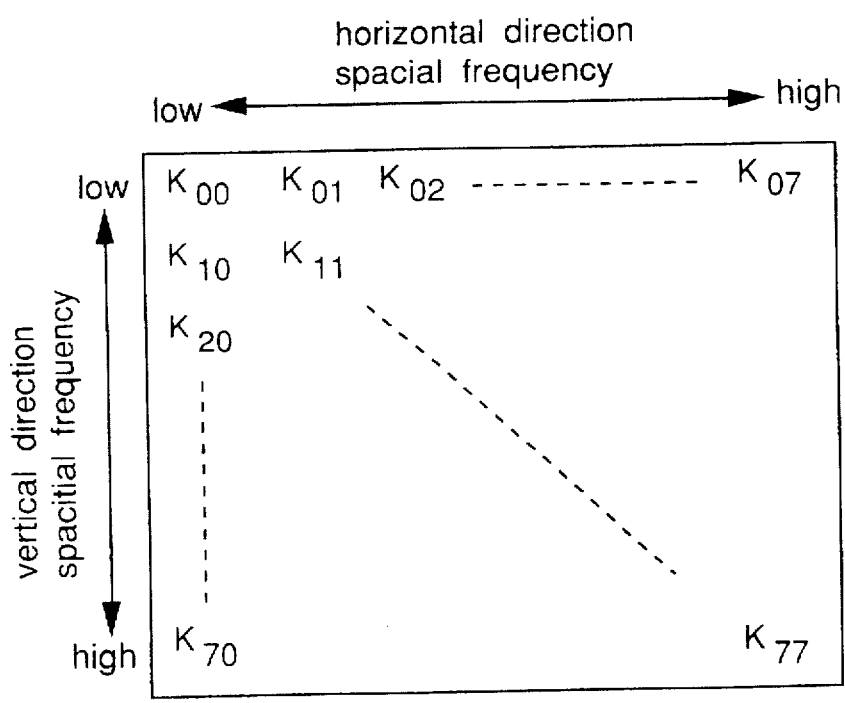
FIG. 8 is an arrangement view of a transfer coefficients 205 in FIG. 7.
Figures 9, 10:
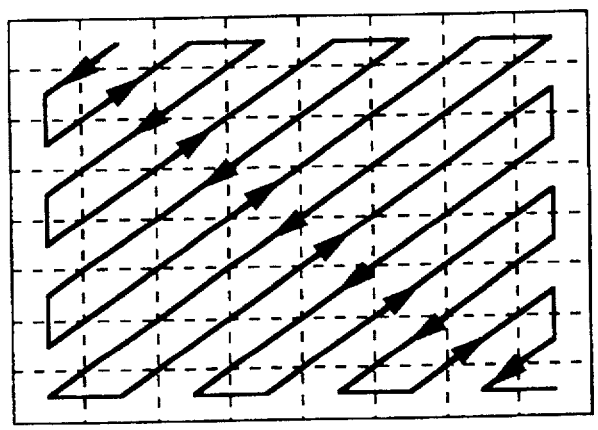
FIG. 9 is a view showing an example of a quantizing table.
FIG. 10 is a view showing the order of a zigzag scanning.

FIG. 7 is another block diagram of a coding circuit 61 in FIG. 3. In FIG. 7, reference numeral 201 is an input image data. Reference numeral 202 is a blocking circuit for blocking the input image data 201 into a block of 8×8 picture elements so as to output the signal 203. Reference numeral 204 is a descrete cosine transforming circuit for effecting a two-dimensional discrete cosine transforming of the blocked input image data 203 so as to output a transfer coefficient 205. FIG. 8 is a arrangement view of a transformed coefficient 205. A transfer coefficient Kij within the block converted by the discrete cosine transfer circuit 204 is arranged as shown in FIG. 8. Reference character Koo is a direct current transfer coefficient (hereinafter DC coefficient) and the coefficients except for Koo are AC transfer coefficients (hereinafter AC coefficient). As the reference characters i, j become greater, the space frequency is higher. Reference numeral 206 is a quantizing circuit for effecting liner quantization of the transfer coefficient 205 for each block at a quantizing step different for each of the positions of the conversion coefficients with the use of the given quantizing table. An example of the quantizing table is shown in FIG. 9. Reference numeral 208 is a difference circuit for outputting a difference value 209 which is a difference between a quantized DC coefficient of a block before one and a quantized DC coefficient 207 of the present block. Reference numeral 210 is a variable length coding circuit for effecting a variable length coding operation such as run length coding, huffman coding or the like in accordance with the appearance probability ratio of the value of the difference value 209.

Reference numeral 212 is a zigzag scanning circuit for scanning the quantized AC coefficient 211 for each block in the order an arrow mark of FIG. 10 shows. Reference numeral 213 is a variable length coding circuit for effecting the variable length coding operation such as the run length coding. Huffman coding or the like with respect to the quantizing AC coefficient 218 zigzag-scanned. Reference numeral 214 is a multiplexing circuit for multiplexing the variable length coded difference value 216 and an AC coefficient 217 so as to output the coded image data 215. The quantized table is accommodated within the quantizing circuit 206. A control portion of a digital copying machine not shown sets the quantized table so that the memory using efficiency of the memory circuit 44 may become optimum.

Figure 11:
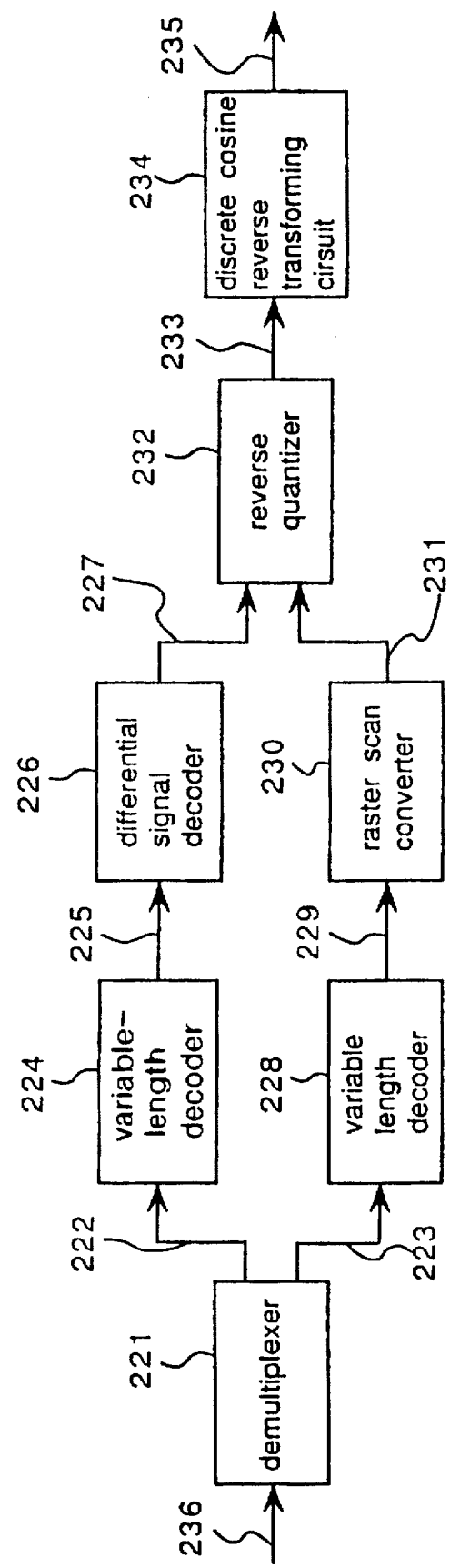
FIG. 11 is a block diagram of the second embodiment of a decoding circuit 64 in FIG. 4.

FIG. 11 is another block diagram of a decoding circuit 64 in FIG. 4. In FIG. 11, reference numeral 236 is a coded image data. Reference numeral 221 is a demultiplexer circuit for separating the variable length coded difference value from the AC coefficient so as to output the variable length coded DC difference value 222 and a variable length coded AC coefficient 223. Reference numeral 224 is a variable length code decoding circuit for decoding the variable length coded difference value 222 so as to output the quantized difference value 225. Reference numeral 226 is a difference decoding circuit for decoding the DC coefficient 227 quantized from the quantized difference value 225. Reference numeral 228 is a variable length code decoding circuit for decoding the variable length coded AC coefficient 223 so as to output the quantized AC coefficient 229. Reference numeral 230 is a raster scan converting circuit for converting into the raster-shaped order the order of the zigzag scanned quantized AC coefficient 229 so as to output the quantized AC coefficient 231 raster scanned. Reference numeral 232 is a reverse quantized circuit for reversely quantizing for each block the quantized conversion coefficient obtained from the quantized DC coefficient 227 and the AC coefficient 231 so as to output the reversely quantized conversion coefficient 233. Reference numeral 234 is a discrete cosine reverse transforming circuit for effecting the discrete cosine reverse transforming of the reversibly quantized conversion coefficient 233 so as to output the decoded image data 235.

Figure 12:
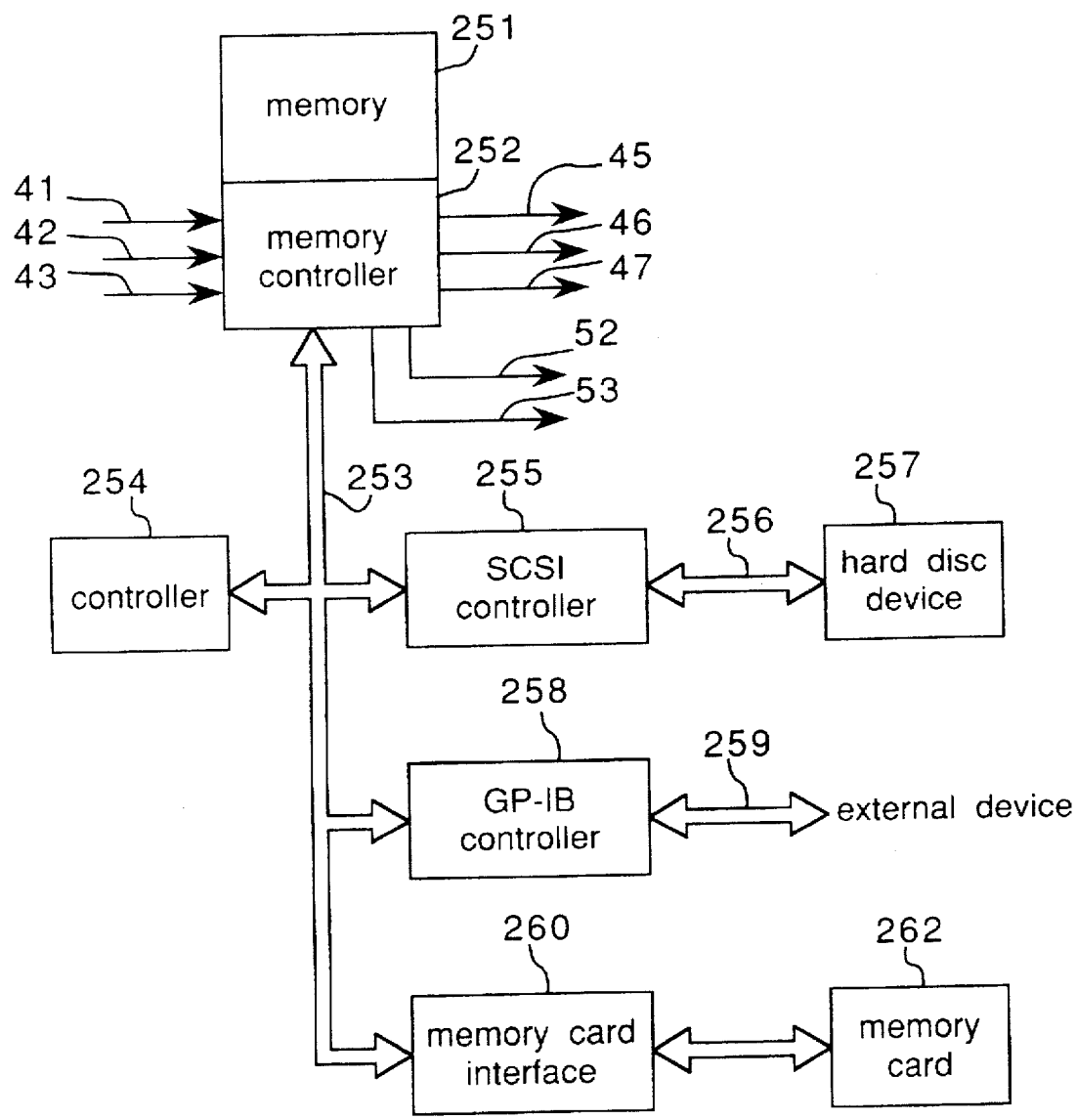
FIG. 12 is a block diagram of a memory circuit 44 in FIG. 2.

A memory circuit 44 in FIG. 2 when a secondary storing means for storing or restoring the coded image signals, a memory card interface and a GP-IB interface are provided, will be described with the use of the drawings. FIG. 12 is a block diagram of a memory circuit 44. Reference numeral 251 is a memory for storing the coded image signals. Reference numerals 41, 42, 43 are coded image signals, reference numerals 45, 46, 47 are coded image signals read from the memory 251. Reference numerals 45, 46, 47 are coded image signals read from the memory 251. Reference numeral 252 is a memory control circuit for controlling the writing and reading of the memory 251. The memory control circuit 252 effects a controlling operation of the writing into the memory 251 of the coded image signals 41, 42, 43 and a reading operation from the memory 251 of the coded image signals 45, 42, 43. Further, the memory control circuit 252 generates a memory insufficient value 52 showing the insufficient memory capacity when the memory capacity has become insufficient, and a memory sufficient value 53 showing the remaining memory capacity when the memory capacity has become sufficient at the completion of one page of the document sub-scanning reading at the writing into the memory 251 of the coded image signals 41, 42, 43. The memory controlling circuit 252 controls the access of the memory 251 through the bus line 253.

Reference numeral 254 is a control circuit, reference numeral 255 is a SCSI controller, reference numeral 257 is a hard disk apparatus, reference numeral 258 is a GP-IB controller, reference numeral 260 is a memory card interface circuit, reference numeral 262 is a memory card.

When coded image signals stored in a memory 251 are stored in a hard disk apparatus 257, the control circuit 254 stores in a hard disk apparatus 257 through a SCSI bus 256 with the use of the SCSI controller 255. The same thing can be said even when the coded image signal stored in the hard disk 257 is stored in the memory 251. An optical disk apparatus, instead of a hard disk apparatus, may be used.

When the coded image signal stored in the memory 251 is fed to an external appliance. (for example, a computer) of the present digital copying machine, the control circuit 254 feeds the coded image signal within the memory 251 to an external appliance through a GP-IB bus 258 bus connected to the external appliance with the use the GP-IB controller 258. The thing can be said when the coded image signal to be fed from the external appliance is stored in the memory 251.

When the coded image signals stored in the memory 251 are stored in the memory card 262, the control circuit 254 stores the coded image signals within the memory 251 at the memory card 262 through a memory card interface circuit 260. The same thing can be said even when the coded image signals stored in the memory card 262 are moved to a memory 251.

By the above described construction, a digital copying machine in the first embodiment of the present invention does not require to drive at a high speed in accordance with the operation of the printer portion the sub-scanning portion of the document reading portion even when the high speed copying operation is effected by the provision of a memory of storing, by at least one page portion of the maximum document size, the coded, compressed image signals, so that the increase in the cost due to the provision of the memory can be made extremely less. By the provision of a secondary storing means such as magnetic recording means and so on, and means for storing, reproducing the above described compressed image signals, many document images can be stored, reproduced without increase in the storing capacity of the memory. In addition, by the provision of an interface means for inputting, outputting, with respect to the external appliance, the compressed image signals of the above described memory, the document image signals can be outputted to the external appliance with less transfer data amount so as to print the image signals from the external appliance. A compression ratio setting means is provided which makes the compression ratio of the above described image signal compressing means larger if the capacity of the memory is insufficient, makes the compression ratio of the above described image signal compressing means smaller if the amount of the memory is sufficient when the document is prescanned prior to the copying operation, the memory capacity can be used efficiently. In addition, the memory can be increased. As the compression ratio of the image signals can be made smaller by the increase in the above described memory, the high picture quality of the copying images can be effected with ease.

The second embodiment of the digital copying machine of the present invention will be described hereinafter with reference to the drawings.

Figure 13:
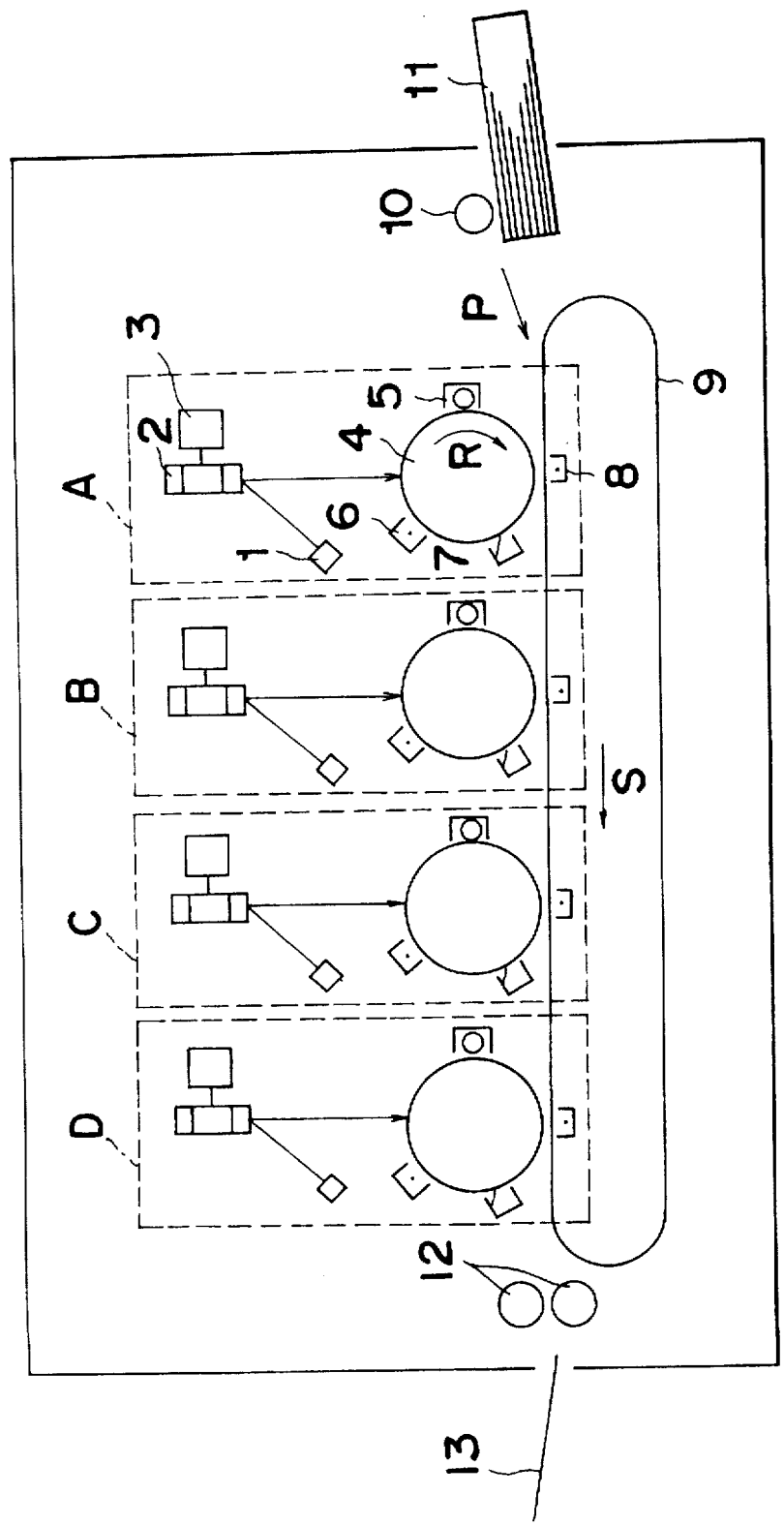
FIG. 13 is a schematic block diagram of a printer portion in the second embodiment of a digital copying machine of the present invention.

FIG. 13 is a schematic construction view of a printer portion in the second embodiment of the digital copying machine of the present invention. In FIG. 13, reference numeral 1 is a semiconductor laser. Reference numeral 2 is as polygon mirror which is rotated by a polygon motor 3. The polygon mirror 2 reflects the laser beams from the semiconductor laser 1 so as to scan the photosensitive drum 4. The photosensitive drum 4 rotates in an arrow mark R direction so as to form static latent images on the photosensitive drum face in accordance with the laser beam strength. Reference numeral 5 is a developer for developing the static latent images on the photosenstive drum with Bk (black) toner so as to form toner images. Reference numeral 10 is a paper feeding roller for feeding one piece by one piece into the printer in an arrow mark P direction copying papers stocked in the paper cassette 11. Reference numeral 9 is a carrying belt for moving in an arrow mark direction so as to carry the fed copying papers. Reference numeral 8 is a transfer charger for transferring toner images formed on the photosensitive drum 4 on the copying papers on the carrying belt 9. The peripheral speed of the photosenstive drum 4 is the same as the speed of the carrying belt 9. Reference numeral 7 is a cleaner for recovering the remaining toner on the photosensitive drum 4 so as to clean the photosensitive drum 4. Reference numeral 6 is a main charger for uniformly charging the photosensitive drum 4. Image forming process described hereinabove is a known electronic photograph process.

An image forming portion A is composed of a semiconductor laser 1, a polygon mirror 2, a polygon motor 3, a photosensitive drum 4, a developer 5, a main charger 6, a cleaner 7 and a transfer charger 8. Image forming portions B, C and D which are similar to the image forming portion A effect a developing operation respectively with the toner of C (cyan), M (magenta) and Y (yellow). The toner images of Bk, C, M, Y are transferred while the copying papers are carried with a carrying belt so as to form color images on the copying papers. Reference No. 12 is a fixer for fixing the toner, provided on the copying papers. Reference No. 13 is a paper outlet tray for the copied papers.

Figure 14:
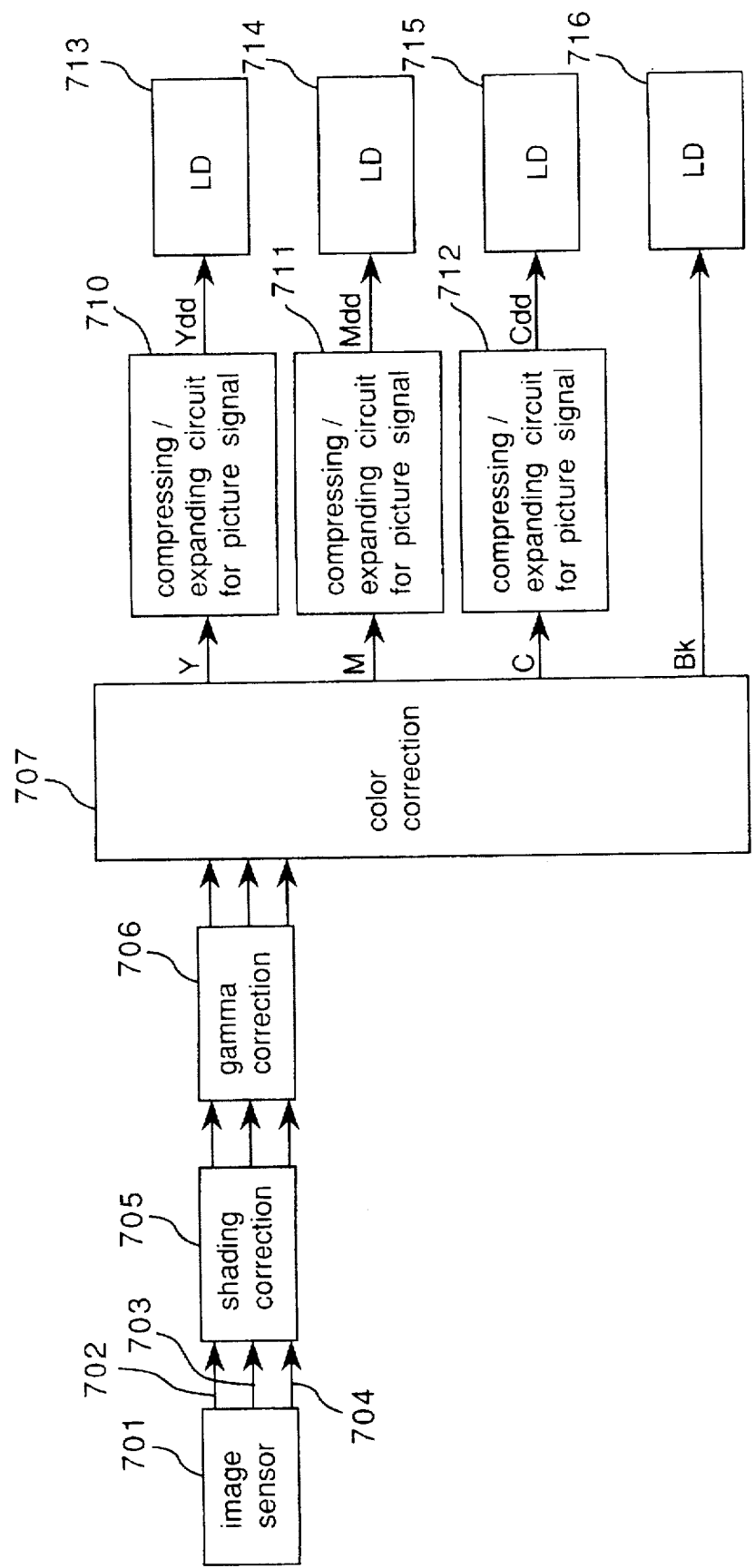
FIG. 14 is a block diagram showing the flowing of image signals in the second embodiment of a digital copying machine of the present invention.

FIG. 14 is a block diagram showing the flowing of the image signals in a second embodiment of the digital copying machine of the present invention. In FIG. 14, reference numeral 701 is a line image sensor so as to output image signals 702, 703 and 704 of the document color separated into R, G, B. Reference numeral 705 is a shading correcting circuit for correcting the shading portion of the image signals from the image sensor 701. Reference numeral 706 is a gamma correcting circuit for correcting the gradation property of the image signals corrected in shading. Reference numerals 707 is a color correcting circuit for calculating a proper amount of 8-bit signals Y (yellow), M (magenta), C (cyan) necessary to the printing and also, calculating the proper 8-bit signal Bk (black) for ink plate production. Reference numerals 710, 711 and 712 are image signal compressing, expanding circuits for delaying by a given time respectively the signals Y, M and C so as to output the signals Ydd, Mdd and Cdd. Reference numeral 713, 714, 715 and 716 are laser drivers for driving semiconductor lasers in accordance with signals Ydd, Mdd, Cdd and Bkd. The laser driver 713 drives the semiconductor laser of the image forming portion D in FIG. 13, the laser driver 714 drives the semiconductor laser of the image forming portion C, the laser driver 715 drives the semiconductor laser of the image forming portion B, the laser driver 716 drives the semiconductor laser of the image forming portion A. As showing in FIG. 13, the image signal compressing, expanding circuit 710 delays the signal Y by a time portion for which the copying paper moves from the image forming portion A to the image forming portion D. Similarly, the image signal compressing, expanding circuit 711 delays the signal M by a time portion for which the copying paper moves from the image forming portion A to the image forming portion C. The image signal compressing, expanding circuit 712 delays a signal C by a time portion for which the copying paper moves from the image forming portion A to the image forming portion B.

Figure 15:
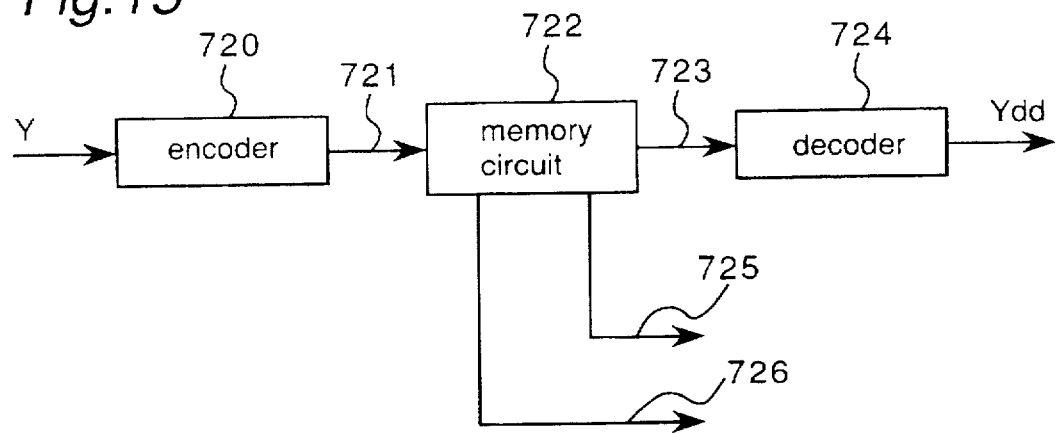
FIG. 15 is a block diagram of an image signal compressing, expanding circuit 710 in FIG. 13.

FIG. 15 is a block diagram of the image signal compressing, expanding circuit 710 in FIG. 14. In FIG. 15, reference numeral 720 is a coding circuit for coding, compressing the image signal Y so as to output the compressed image signal 721. Reference numeral 722 is a memory circuit provided with a buffer memory for effecting a FIFO operation for temporarily storing so as to delay the coded image signal, where the coded image signals 721 are stored. The memory circuit 722 outputs a memory insufficient value 725 showing how much memory capacity is insufficient when the memory capacity has been insufficient till the completion of the sub-scanning reading of the document, and outputs the memory sufficient value 726 showing the remaining memory capacity in the sufficient memory capacity. The control portion of the digital copying machine not shown sets the parameter of the coding circuit 720 so that the compression ratio may become optimum with the use of the memory insufficient value 725 and the memory sufficient value 726.

The decision of the above described parameter by the control portion of the digital copying machine is effected in accordance with the memory insufficient value 725 and the memory sufficient value 726 at a time point when the reading scanning (prescanning) of the document in prior to the copying operation of the document has been completed. When the memory capacity is insufficient at the prescanning completion time, the above described control portion judges that the re-setting of the above described parameter is unnecessary so as to effect the copying portion. When the memory capacity is sufficient at the prescanning completion time, the above described control portion re-sets the above described parameter so that the compression ratio may become smaller. When the memory capacity has become insufficient, the above described control portion re-sets the above described parameter that the compression ratio may become larger so as to effect the prescanning operation again.

Reference numeral 724 is a decoding circuit for decoding the coded image signal 723 to be outputted from the memory circuit 722 so as to output the expanded image signal Ydd. The coding circuit 720 is the same in construction as the coding circuit 61 of FIG. 3 used in the description of the first embodiment. The decoding circuit 724 is the same in construction as the decoding circuit 64 of FIG. 4 used in the description of the first embodiment.

The memory of the memory circuit 722 can be increased. As the compression ratio of the image signals in the coding circuit may be made smaller by the increase in the above described memory, the higher picture quality of the copying images may be effected with ease.

As the digital copying machine in the second embodiment of the present invention stores in the memory for the delay the compressed picture signals by the above described construction, the memory capacity may be made smaller if the number of the picture elements by the higher resolution increases and the number of the bits per picture element accompanied by the higher picture quality increases. A compression ratio setting means is provided which makes the compression ratio of the above described image signal compressing means larger if the capacity of the memory is insufficient, makes the compression ratio of the above described image signal compressing means smaller if the capacity of the memory is sufficient when the document is prescanned prior to the copying operation, the memory capacity can be used efficiently. In addition, the memory may increase. As the compression ratio of the image signals may be made smaller by increase in the above described memory, the higher picture quality of the copying images may be effected easily. The print color of the image forming means longest in the delay time is made a color (yellow in a case of the present embodiment) for tolerating the reduction of the resolution in visibility so that the capacity of the memory can be reduced by the setting of the large compression ratio in the coding operation of the image signal of the color. Similarly, the print color of the image forming means which does not require the delay is made a color (black in the case of the present embodiment) which is most required in the high resolution in visibility so that the image signal of the color can be copied without the picture quality deterioration by the coding portion.

A third embodiment of the digital copying machine of the present invention will be described hereinafter with reference to the drawing.

Figure 16:
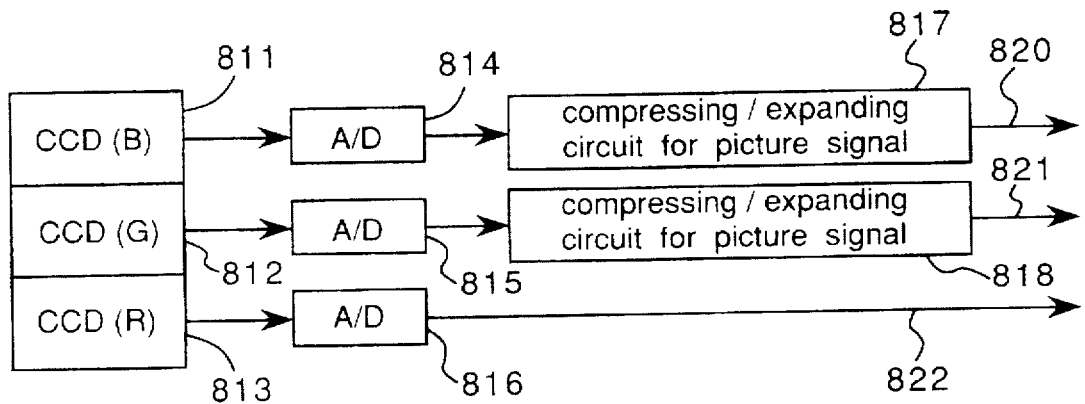
FIG. 16 is a block diagram of an image processing portion in a third embodiment of a digital copying machine of the present invention.

FIG. 16 is a block diagram of an image processing portion in the third embodiment of the digital copying machine of the present invention. In FIG. 16, reference numeral 811 is a B (blue) line sensor, reference numeral 812 is a G (green) line sensor, reference numeral 813 is a R (red) line sensor. Reference numerals 814, 815, 816 are A/D converters for converting the analog signals from the line sensor into digital signals. An A/D converter 816 outputs a signal 822. Reference numeral 817 is an image signal compressing, expanding circuit provided with a function for delaying by a n line portion the signal from the B line sensor for outputting the B sensor signal 820 delayed by a n line. Reference numeral 818 is an image signal compressing, expanding circuit having a function of delaying by a m line portion a signal from the G line sensor for outputting a G sensor signal 821 delayed by a m line.

Figure 17:
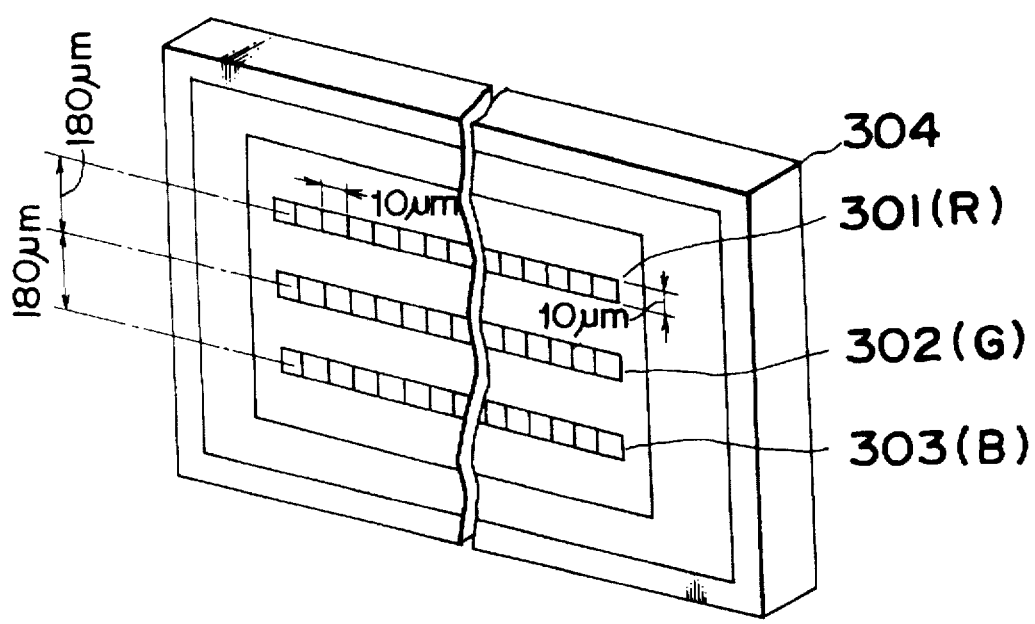
FIG. 17 is a schematic block diagram of a CCD color image sensor of a line parallel type to be used in the third embodiment of a digital copying machine of the present invention.
Figure 21:
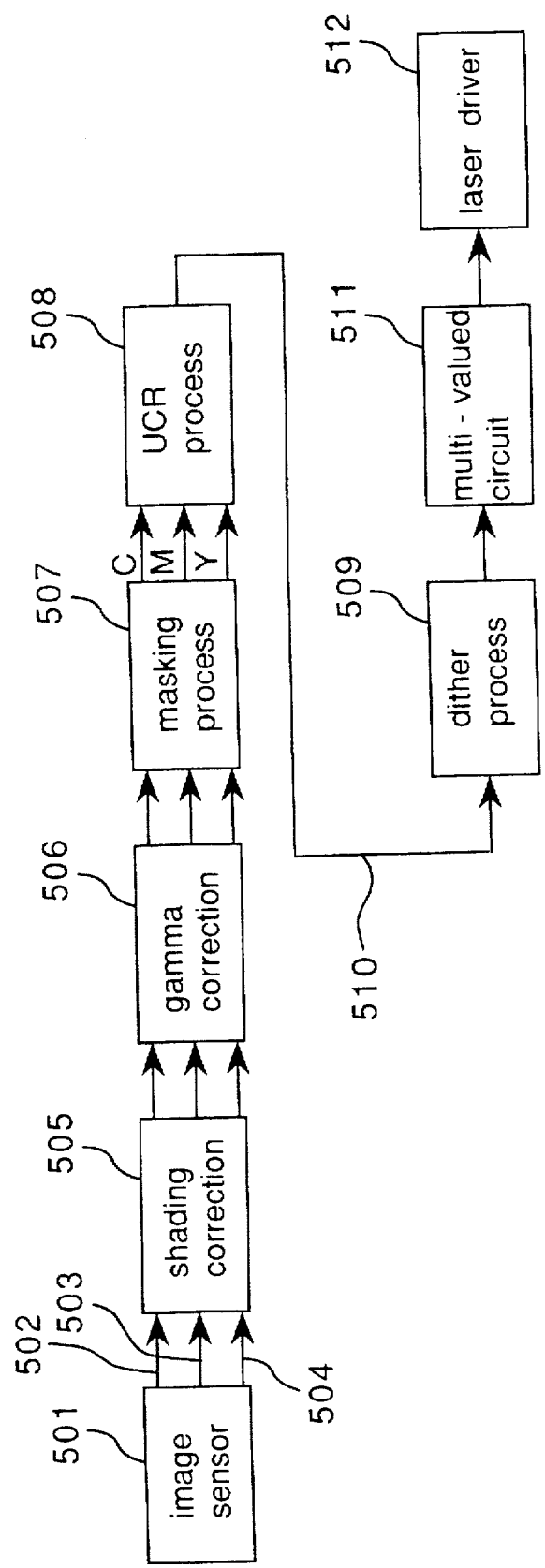
FIG. 21 is a block diagram showing the flowing of the image signals in the first embodiment of the conventional digital copying machine.
Figure 22:
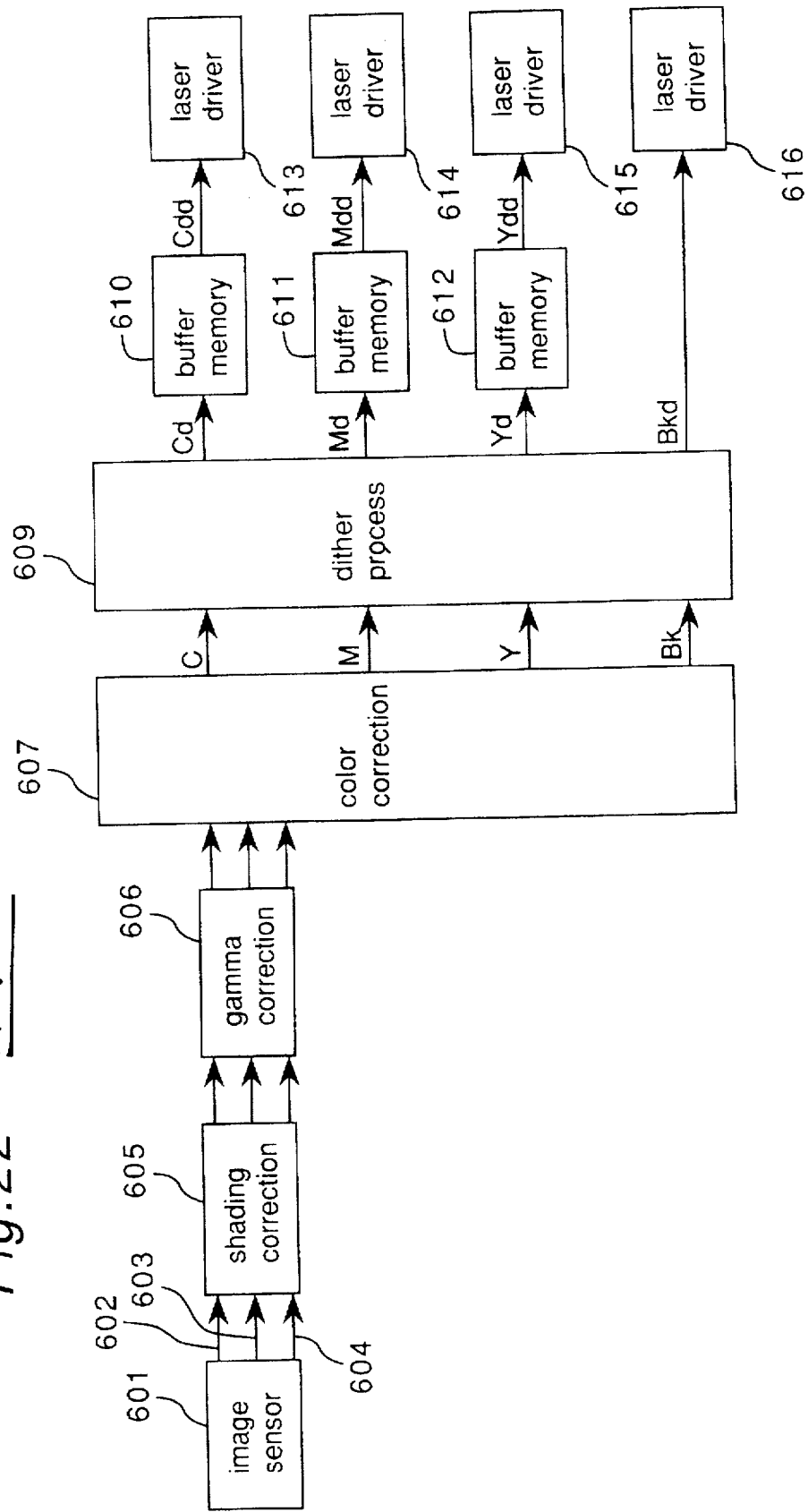
FIG. 22 is a block diagram showing the flowing of the image signals in the second embodiment of the conventional digital copying machine.
Figure 23:
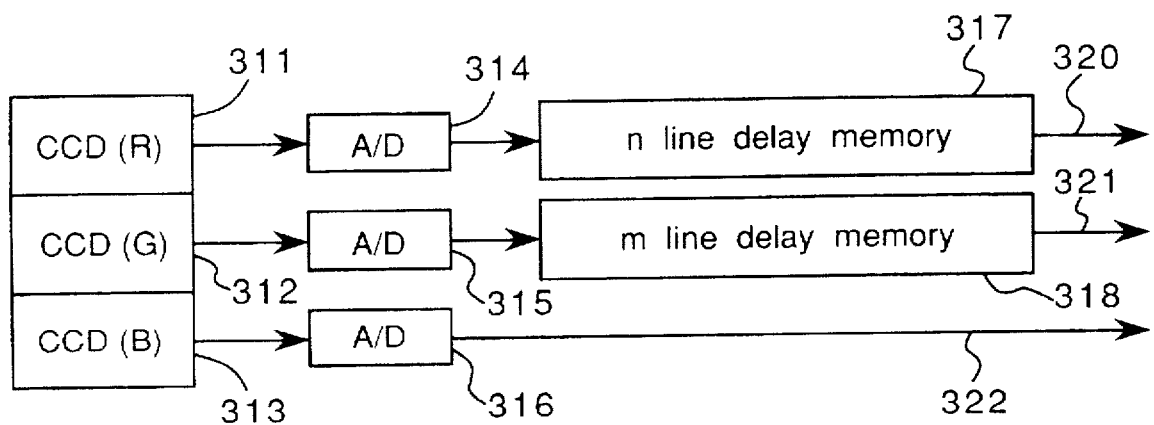
FIG. 23 is a block diagram of an image processing portion in the third embodiment of the conventional digital copying machine.
Figure 24:
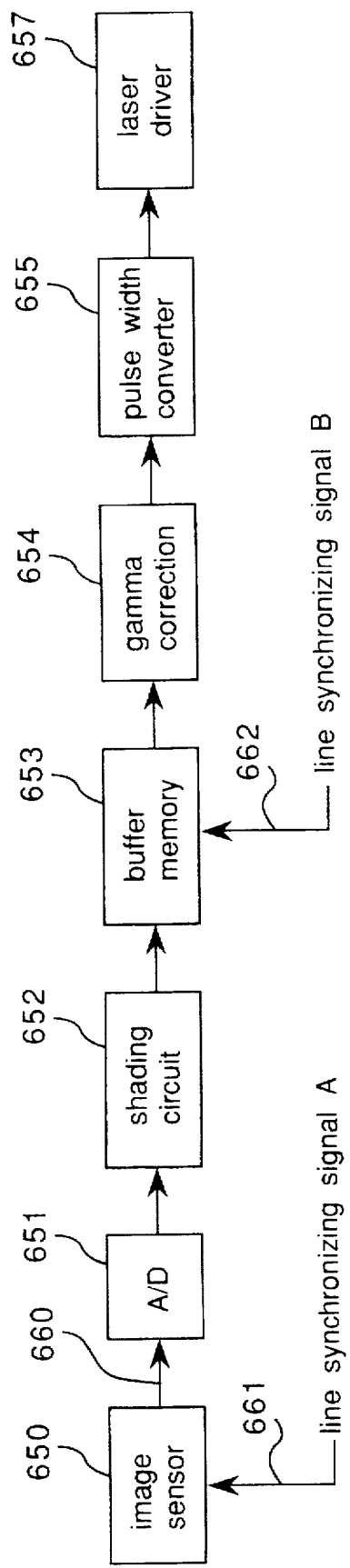
FIG. 24 is a block diagram showing the flowing of the image signals in the fourth embodiment of the conventional digital copying machine.

FIG. 17 is a schematic construction view of a CCD color image sensor of a 3-line parallel type to be used in the third embodiment of the digital copying machine of the present invention. In FIG. 17, reference numeral 301 is a R (red) line sensor, reference numeral 302 is a G (green) line sensor, reference numeral 303 is a B (blue) line sensor, reference numeral 304 is a color image sensor IC main body.

In the present embodiment, an interval between line sensors is 180 μm, a sensor picture element width is 10 μm. When the document is auxiliary scanned to read the document images with the use of the color image sensor, the reading positions on the document of the image signals of R, G, B are not the same in the sub-scanning direction. Namely, when the multiplication of the copying operation is as equal as the document, the B signal precedes by a 36 line portion with respect to the R signal and the G signal precedes by a 18 line portion with respect to the R signal. In order to set the document reading position of the R, G, B signals at this time, the delay line number n in the image signal compressing, extending circuit 817 of FIG. 16 is n=36, the delay line number m in the image signal compressing, expanding circuit 818 is m=18. In order to realize the varying multiplication copying in the sub-scanning direction, the sub-scanning speed in the document reading is varied. At the enlargement of 400%, m=144, n=72. Namely, for the varied multiplication up to 400%, the image signal compressing, expanding circuit 817 of FIG. 16 is required to be delayed by a 144 line portion at maximum. The image signal compressing, expanding circuit 818 is required to be delayed by a 72 line portion at maximum.

Figure 18:
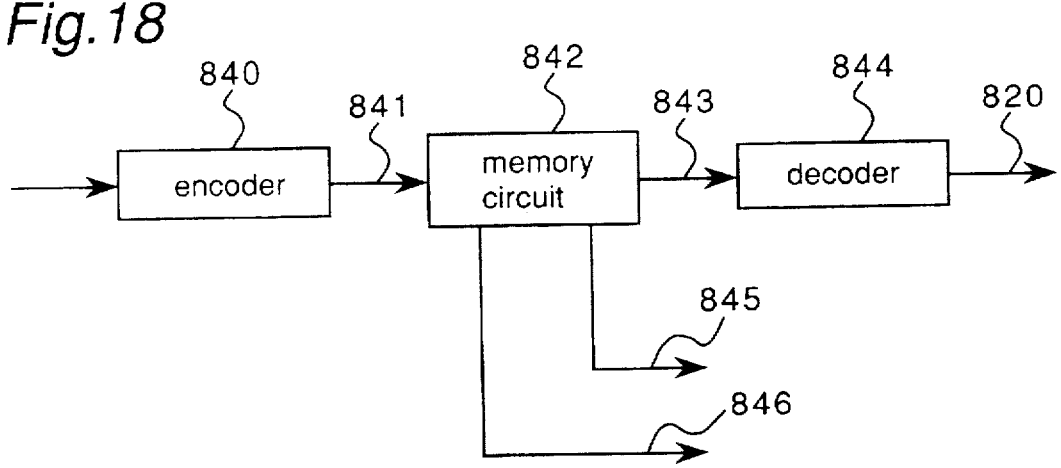
FIG. 18 is a block diagram of an image signal compressing, extending circuit 817 in FIG. 16.

FIG. 18 is a block diagram of an image signal compressing, expanding circuit 817 in FIG. 16. In FIG. 18, reference numeral 840 is a coding circuit for coding, compressing the input image signals so as to output the compressed image signals 841. Reference numeral 842 is a memory circuit provided with a buffer memory for temporarily storing and effecting a FIFO operation for delaying the coded image signal so as to store the coded image signal 841. The memory circuit 842 outputs a memory insufficient value 845 showing how much insufficient in the memory capacity when the memory capacity till the completion of the sub-scanning reading of the document, and outputs a memory sufficient value 846 showing the remaining memory capacity when the memory capacity has been sufficient. The control portion of the digital copying machine not shown sets the parameter of the coding circuit 840 so that the compression ratio may become optimum by the use of the memory insufficient value 845 and the memory insufficient value 846.

The decision of the above described parameters by the control portion of the digital copying machine is effected in accordance with the memory insufficient value 845 and the memory sufficient value 846 at a time point when the reading scanning operation (prescanning) of the document to be effected prior to the copying portion of the document has been completed. When the memory capacity is insufficient at the prescanning completion, the above described control portion judges that the re-setting of the above described parameters is unnecessary so as to effect the copying operation. When the memory capacity is sufficient at a time point of the prescanning completion, the above described control portion re-sets the above described parameters so that the compression ratio may become small. When the memory capacity is insufficient, the above described control portion re-sets the above described parameters so that the compression ratio may become large so as to effect the prescanning operation again.

Reference numeral 844 is a decoding circuit for decoding the coded image signal 843 to be outputted from the memory circuit 842 so as to output the decoded image signal 820. The coding circuit 840 is the same in construction as the coding circuit 61 of FIG. 3 used in the description of the first embodiment. The decoding circuit 844 is the same in construction as the decoding circuit 64 of FIG. 4 used in the description of the first embodiment.

The memory of the memory circuit 842 may increase. As the compression ratio of the image signals in the coding circuit 840 may be made small by the increase in the above described memory, the higher picture quality of the copying images can be effected easily. The image signal compressing, expanding circuit 818 is the same in construction as the image signal compressing, expanding circuit 817 although the delay amount between them is different.

By the above described construction, the digital copying machine in the third embodiment of the present invention stores in the memory for the delaying by the given line portion the compressed image signals, so that the memory capacity for the line delay may be made smaller even if the number of the picture elements by the higher resolution increases, the enlargement copying range increases, the number of the bits per picture element accompanied by the high picture quality increases. A compressing ratio setting means for making the compression ratio of the image signal compressing means larger when the capacity of the memory has been insufficient at the prescanning operation prior to the copying operation, and for making the compression ratio of the above described image signal compressing means smaller when the capacity of the memory has been sufficient is provided, so that the memory capacity may be used efficiently. In addition, the memory may increase. As the compression ratio of the image signal may be made small by increase in the above described memory, the higher picture quality of the copying images may be effected easily. The image signals of a color most in the number of the delay lines is made a color (blue in a case of the present embodiment) for most tolerating the reduction of the resolution in visibility so that the capacity of the memory can be reduced by the setting of the large compression ratio in the coding operation of the image signal of the color.

A fourth embodiment of the digital copying machine of the present invention will be described hereinafter with reference to the drawings.

FIG. 19 is a block diagram showing the flowing of the image signals in the fourth embodiment of the digital copying machine of the present invention. In FIG. 19, reference numeral 850 is a line image sensor for outputting the image signal 860 of the document. Reference numeral 851 is an A/D converter for converting the image signals from the image sensor 850 into the digital image signals. Reference numeral 852 is a shading correcting circuit for correcting the shading distortion of the image signal caused in the document reading operation. Reference numeral 853 is an image signal compressing, expanding circuit for temporarily coding the image signal corrected in shading so as to effect a buffering operation, and thereafter, to output image signals decoded through the synchronization with the line synchronizing signal B 862. Reference numeral 854 is a gamma correcting circuit for correcting the gradation property of the decoded image signal to be outputted from the image signal compressing, expanding circuit 853. Reference numeral 855 is a pulse width modulating circuit for effecting pulse width modulation in accordance with the inputted image signal. Reference numeral 857 is a laser driver for driving the semiconductor laser with a signal modulated in pulse width from the pulse width modulating circuit 855. A printer portion including the laser driver 857 is a known laser beam printer.

Assume that the resolution in the sub-scanning direction at the document image reading operation is 400 DPI, the sub-scanning speed is 7 inch/sec in the present embodiment, and the frequency of the line horizontal synchronizing signal A 861 of the image sensor 850 is 2.8 KHz. Assume that the sub-scanning speed at the image forming time of the printer portion is 6 inch/second, and the frequency of the line horizontal synchronizing signal B 862 is 2.4 KHz when the image from the buffer memory 853 is read. Assume that the successive printing speed of A3 size of the printer portion is 20 sheets/sec (3 sec/sheet) when the document of the A3 size is successively copied. As it takes (420 mm)/(7 inch/sec)= 2.36 sec for the document reading portion to effect the sub-scanning operation of the A3 size document at this time, the document reading portion has only to effect the acceleration for the sub-scanning and the return operation to the waiting portion after the sub-scanning completion within 0.64 sec or less. At this time, the image signal compressing, expanding circuit 853 is required to buffer the image signals of at least 946 line portion.

FIG. 20 is a block diagram of the image signal compressing, expanding circuit 853 in FIG. 19. In FIG. 20, reference numeral 870 is a coding circuit for coding, compressing the input image signals so as to output the compressed image signals 871. Reference numeral 872 is a memory circuit provided with a buffer memory for effecting a FIFO operation of a temporary storing operation so as to delay the coded image signals for storing the coded image signal 871. The memory circuit 872 outputs the memory insufficient value 875 showing how much insufficient the memory capacity is when the memory capacity is insufficient before the auxiliary scan reading of the document is completed, and outputs the memory sufficient value 876 showing the remaining memory capacity when the the memory capacity is sufficient. The control portion of the digital copying machine not shown sets the parameters of the coding circuit 870 so that the compression ratio may become optimum by the use of the memory insufficient value 875 and the memory sufficient value 876.

The decision of the above described parameters by the control portion of the digital copying machine is effected in accordance with the memory insufficient value 875 and the memory sufficient value 876 at a time point when the reading scanning (prescanning) operation of the document to be effected prior to the copying portion of the document has been completed. When the memory capacity is insufficient at the prescanning completion, the above described control portion judges that the re-setting of the above described parameters is unnecessary and then, effects the copying operation. When the memory capacity is sufficient at a time point of the prescanning completion, the above described control portion re-sets the above described parameters so that the compression ratio may become small. When the memory capacity is insufficient, the above described control portion re-sets the above described parameters so that the compression ratio may become large so as to effect the prescanning operation again.

Reference numeral 874 is a decoding circuit for decoding the coded image signal 873 to be read from the memory circuit 872 so as to synchronize the expanded image signal with the line synchronizing signal B 862. The coding circuit 870 is the same in construction as the coding circuit 61 of FIG. 3 used in the description of the first embodiment. The decoding circuit 874 is the same in construction as the decoding circuit 64 of FIG. 4 used in the description of the first embodiment.

The memory of the memory circuit 872 may increase. As the compression ratio of the image signal in the coding circuit may be made small by the increase in the above described memory, the higher picture quality of the copying images can be effected easily.

By the above described construction, the digital copying machine in the fourth embodiment of the present invention stores in the buffer memory the coded image signals, and the memory capacity for the buffering may be made smaller even if the number of the picture elements by the higher resolution increases, the number of the bits per picture element accompanied by the high picture quality increase. A compressing ratio setting means for making the compression ratio of the image signal compressing means larger when the capacity of the memory has been insufficient at the prescanning operation of the document prior to the copying operation, and for making the compression ratio of the above described image signal compressing means smaller when the capacity of the memory has been sufficient is provided, so that the memory capacity may be used efficiently. In addition, the memory may increase. As the compression ratio of the image signals may be made small by increase in the above described memory, the higher picture quality of the copying images may be effected easily.

As described hereinabove, the digital copying machine for forming the color images in the order of the color face is provided with a memory for storing the compressed image signals by at least one page portion of the maximum document size. Even when the high speed copying operation is effected, the sub-scanning portion of the document reading portion is not required to be driven at high speed in accordance with the operation of the printer portion so that the increase in the cost can be extremely reduced due to the provision of the memory.

The digital copying machine of the present invention is provided with a secondary storing means such as magnetic recording means or the like and with a means for storing, reproducing the above described compressed image signals so that many document images can be stored, reproduced without making the storing capacity of the secondary storing means larger. The digital copying machine of the present invention is provided with an interface means for inputting, outputting, with respect to external appliances, the compressed image signals to be stored in the above described memory so that the document image signals can be outputted to the external appliance and the image signals from the external appliance can be printed with less transfer data amount.

The digital copying machine provided with an image forming means for each color in the present invention can reduce the memory capacity, thus reducing the memory cost if the number of the picture elements because of the high resolution increases and the number of the bits per picture element accompanied by the high picture quality increases so as to store the compressed image signals in the memory for the delay.

The digital copying machine using a line parallel type of color image sensor in the preset invention can reduce the memory capacity for the line delay, thus reducing the cost if the number of the picture elements because of high resolution increases, the enlargement copying range increases, the number of the bits per picture element accompanied by the high picture quality increases so as to store the coded image signals in the memory for delaying them by the given line portion.

The digital copying machine for forming images by an image forming means while reading the document images by the above described document reading means of the present invention can reduce the memory capacity for buffering operation, thus reducing the cost if the number of the picture elements because of high resolution increases, the number of the bits per picture element accompanied by the high picture quality increases, so as to store in the buffer memory the coded image signals.

The digital copying machine provided with the image compressing, expanding means of the present invention is provided with a compressing ratio setting means which makes the compression ratio of the image signal compression means larger when the capacity of the memory has been made insufficient and makes the compression ratio of the above described image signal compressing means smaller when the capacity of the memory has been made sufficient in the prescanning operation of the document prior to the copying operation so that the memory capacity can be used efficiently.

Also, the digital copying machine of the present invention can improve the picture quality of the copying images easily by the increase in the memory.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A digital copying machine comprising
    a document reading means for reading a document and for outputting a plurality of color image signals of many reading gradations with the image information of the document being separated in color,
    a color printer provided with a plurality of image forming means for each color,
    an image signal processing means for processing the color image signals from the document reading means so as to output a plurality of image signals for each of the plurality of image forming means,
    an image signal compressing means for compressing respective ones of the image signals for each of the plurality of image forming means,
    a memory, coupled to the image signal compressing means, for temporarily storing image signals in less than one page portion for the maximum document size which have been compressed by the image signal compressing means,
    an image signal expanding means for expanding the image signals stored in the memory,
    wherein the plurality of image signals for each of the image forming means is delayed by a predetermined amount of time different for each of the image forming means, one of said plurality of image signals with a large tolerance in resolution reduction has a greater delay amount than others of said plurality of image signals, and color images are reproduced by the image forming means for each of the colors in accordance with the plurality of image signals of each color expanded by the image signal expanding means.

2. A digital copying machine as defined in claim 1, wherein a compression ratio setting means is provided for making a compression ratio of the image signal compressing means larger when the capacity of the memory has been made insufficient, and for making the compressing ratio of the image signal compressing means smaller when the capacity of the memory has been made sufficient in a document prescanning operation prior to the copying operation.

3. A digital copying machine comprising
    a document reading means having parallel sensor rows with light receiving elements which are activated at predetermined intervals, for reading a document separated in color by said sensor rows and for producing color image signals,
    a delay means for delaying, by a predetermined amount, the color image signals for each color from the document reading means so as to concurrently output the color image signals at a same position of the document,
    said delay means including;
        an image signal compressing means for compressing the color image signals,
        a memory, coupled to the image signal compressing means, for temporarily storing the color image signals compressed by the image signal compressing means, and
        an image signal expanding means for expanding the color image signals stored in the memory.

4. A digital copying machine as defined in claim 3, wherein a compression ratio setting means is provided for making a compression ratio of the image signal compressing means larger when the capacity of the memory has been made insufficient, and for making the compression ratio of the image signal compressing means smaller when the capacity of the memory has been made sufficient in a document prescanning operation prior to the copying operation.

5. A digital copying machine as defined in claim 4, wherein the color image signal with the largest tolerance in resolution reduction has a greater delay amount than the other color image signals.

6. A digital copying machine comprising:
    a document reading means for reading image information of a documented outputting the image signals,
    an image signal compressing means for compressing the image signals simultaneously while they are read,
    a memory, coupled to the image signal compressing means, capable of temporarily storing image signals less than one page portion of the document images coded by the image signal compressing means,
    an image signal expanding means for expanding the image signals stored in the memory, wherein a sub-scanning speed of the document reading means is faster than a sub-scanning speed of the image forming means, and
    an image forming means for forming permanent images on a record medium in accordance with the image signals expanded by said image signal expanding means, said images are formed by the image forming means while the document is read by the document reading means.

7. A digital copying machine as defined in claim 6, wherein a compression ratio setting means is provided for making a compression ratio of the image signal compressing means larger when the capacity of the memory has been made insufficient, and for making the compression ratio of the image signal compressing means smaller when the capacity of the memory has been made sufficient in a document prescanning operation prior to the copying operation.

8. A digital copying machine for forming images sequentially on a recording member comprising:

a document reading means for reading image information from a document and outputting a plurality of multi-valued color image signals corresponding to the image information, an image signal compressing a means for compressing the plurality of multi-valued color image signals and producing an output, a memory, coupled to the image signal compressing means, capable of temporarily storing the output of the image signal compressing means corresponding to at least one page of the document, an image signal expanding drag means, coupled to the memory, for expanding the output of the image signal compressing means stored in the memory and for producing an output, a color correcting means for converting the image signal expanding means output into color image signals, an image forming means including a single driver for forming permanent overlapping images of different color on a recording medium color plane sequentially from said single driver, a secondary storing means for storing a plurality of document images, a means for accommodating in the secondary storing means said compressed image signals stored in the memory, a means for decoding by the image signal expanding means, the said compressed image signals accommodated in the secondary storing means to form the images on the recording medium.

9. A digital copying machine as defined in claim 8, wherein a compression ratio setting means is provided for making a compression ratio of the image signal compressing means larger when the capacity of the memory is insufficient, and for making the compression ratio of the image signal compressing means smaller when the capacity of the memory is sufficient at a prescanning time of the document prior to the copying operation.

10. A digital copying machine as defined in claim 8, wherein the secondary storing means is a magnetic or optical recording apparatus.

11. A digital copying machine as defined in claim 8, wherein the secondary storing means is a memory card apparatus.

12. A distal copying machine as defined in claim 8, wherein an interface means is provided with a means for outputting to an external appliance image signals stored in the memory, and a means for storing in the memory the coded image signals to be outputted from the external appliance.

13. A digital copying machine as defined in claim 8, 1, 3 or 6, wherein the image signal compressing means comprises a blocking means for blocking the color image signals into N X M picture elements, an orthogonal transforming means for effecting orthogonal conversion of the blocked image signals to output conversion coefficients, a quantizing means for quantizing the conversion coefficients, and a variable length coding means for variable length coding the quantized conversion coefficients.

14. A digital copying machine as defined in claim 13, wherein a compression ratio setting means is provided for changing a quantizing characteristic of the quantizing means of the image signal compressing means so as to make a compression ratio larger when the capacity of the memory has been made insufficient, and for changing the quantizing characteristic of the quantizing means of the image signal compressing means so as to make the compression ratio smaller when the capacity of the memory has been made sufficient in a prescanning operation prior to the copying operation.

15. A digital copying machine as defined in claim 8, 1, 3 or 6, wherein said image signal compressing means is a DPCM provided with a quantizing means.

16. A digital copying machine as defined in claim 15, wherein said compression ratio setting means is provided for changing a quantizing characteristic of the quantizing means of the image signal compressing means so as to make a compression ratio larger when the capacity of the memory has been made insufficient, and for changing the quantizing characteristic of the quantizing means of the image signal compressing means so as to make the compression ratio smaller when the capacity of the memory has been made sufficient in a prescanning operation prior to the copying operation.

17. A digital copying machine as defined in claim 8, 1, 3 or 7, wherein the memory is increased to increase the memory capacity.

* * * * *